Figure 12:
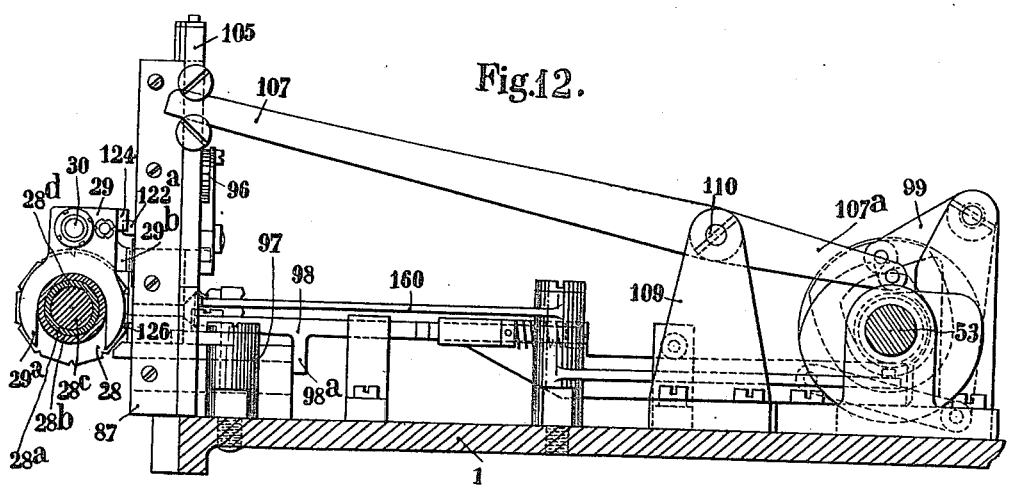

F. SCHIMMEL.
MACHINE FOR CASTING AND COMPOSING SEPARATE TYPE.
APPLICATION FILED JULY 20, 1912.
1,195,742.
Patented Aug. 22, 1916.
15 SHEETS—SHEET 1.
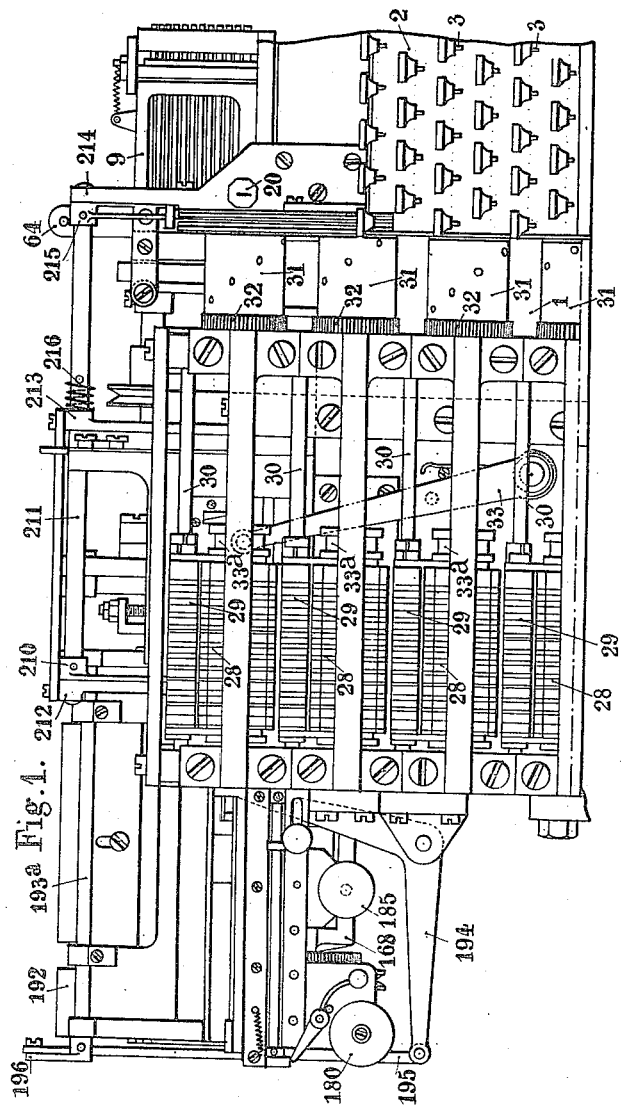
Fig. 1.
WITNESSES
William C. Baker,
J. P. Davis
INVENTOR
Franz Schimmel
BY
ATTORNEYS

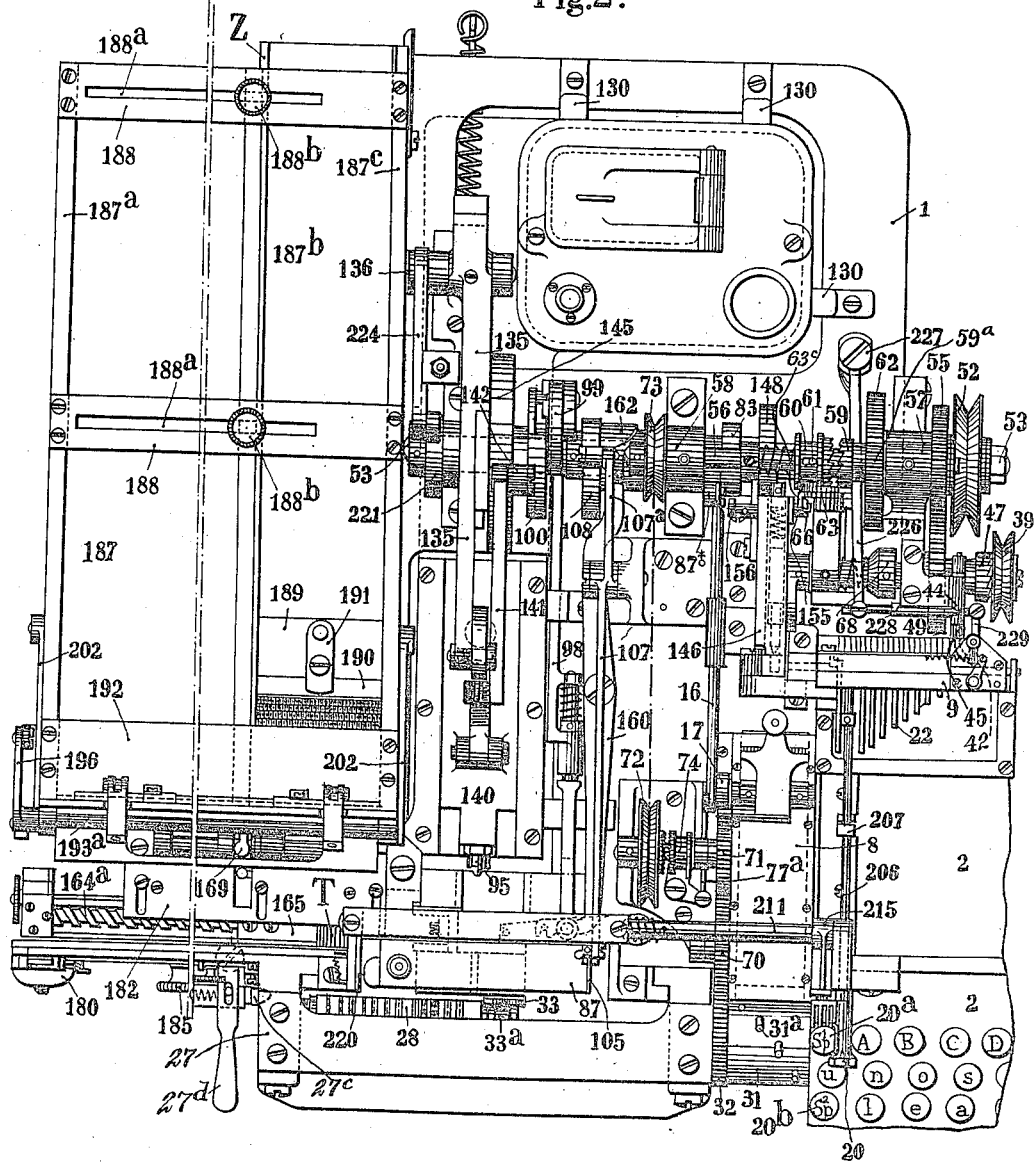

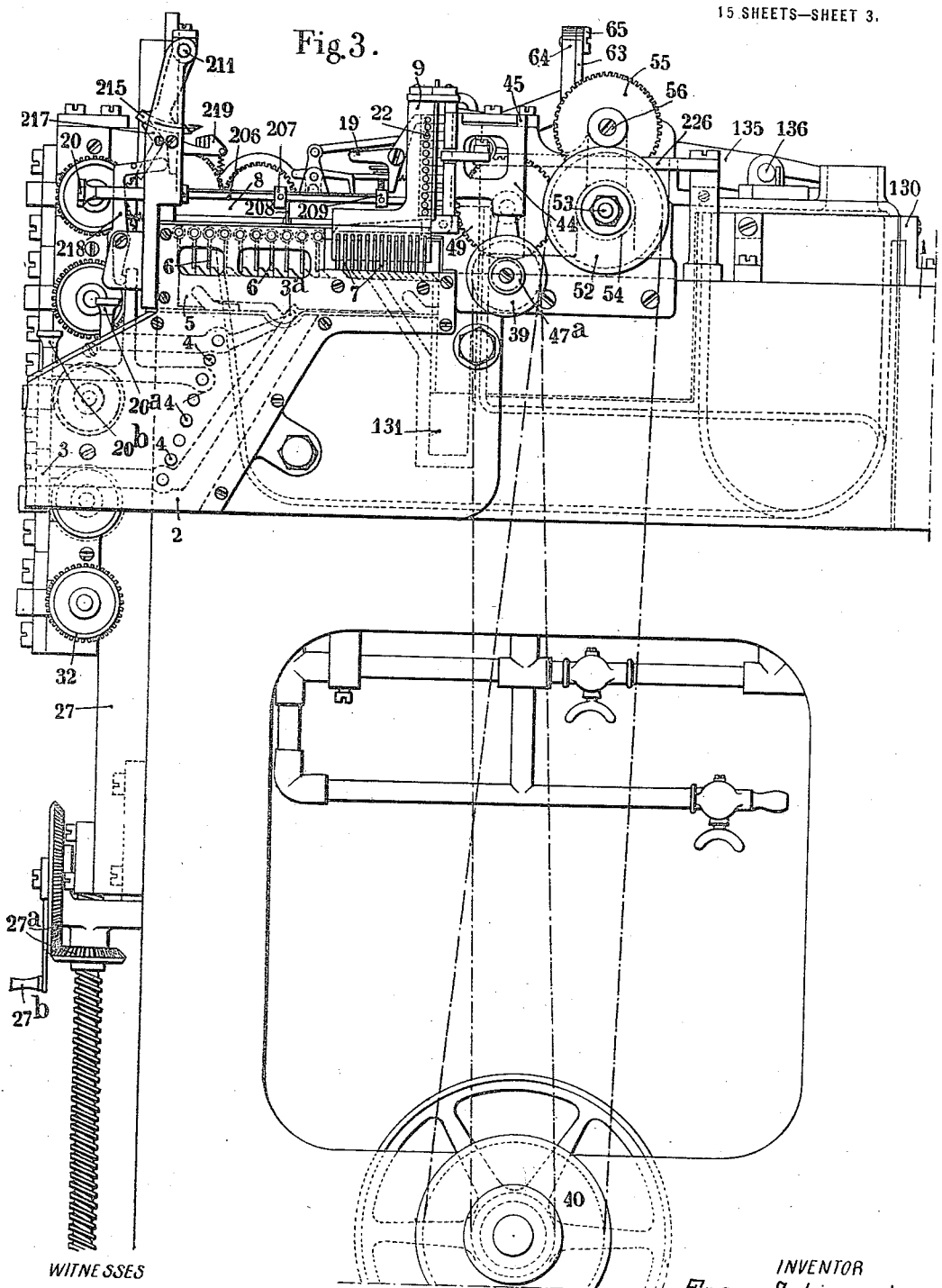

F. SCHIMMEL.
MACHINE FOR CASTING AND COMPOSING SEPARATE TYPE.
APPLICATION FILED JULY 20, 1912.
1,195,742.
Patented Aug. 22, 1916.
15 SHEETS—SHEET 4.
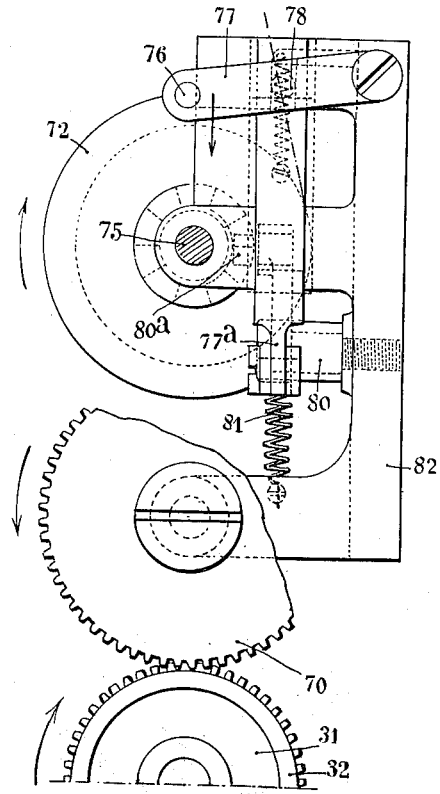
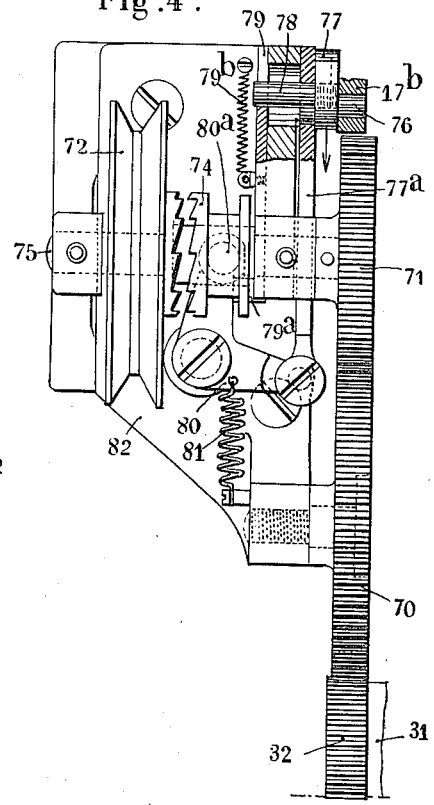
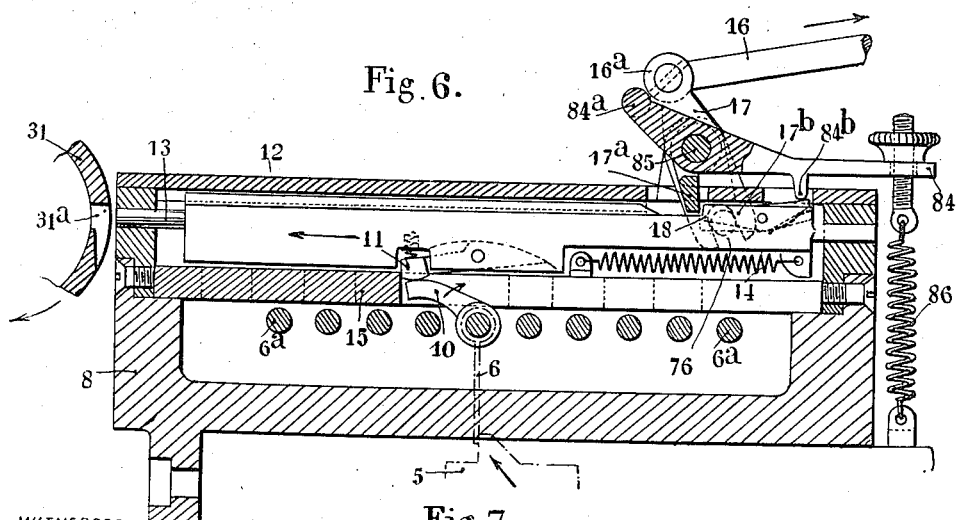
WITNESSES
William C. Baker
J. P. Davis
INVENTOR
Franz Schimmel
BY Munn & Co
ATTORNEYS

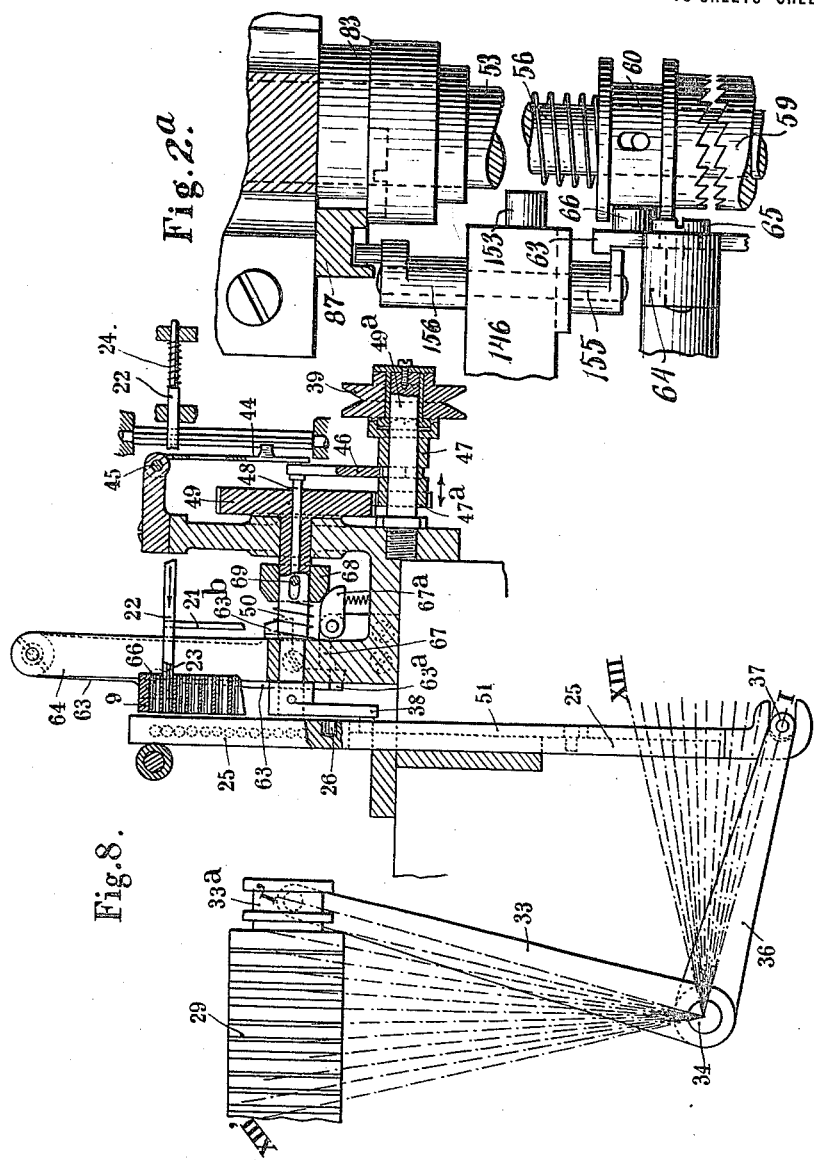

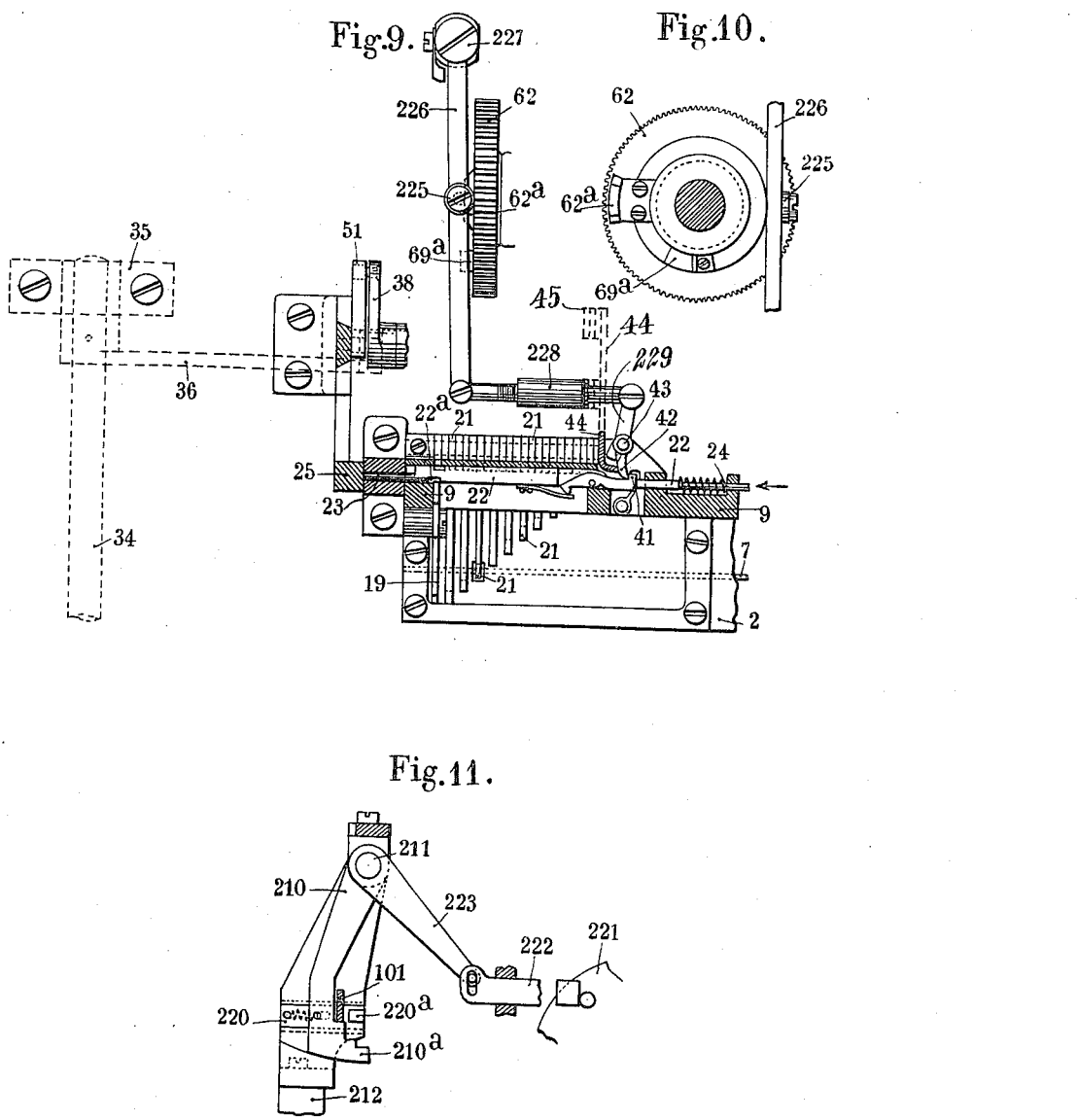

F. SCHIMMEL.
MACHINE FOR CASTING AND COMPOSING SEPARATE TYPE.
APPLICATION FILED JULY 20, 1912.

1,195,742.

Patented Aug. 22, 1916.
15 SHEETS—SHEET 8.

WITNESSES
William C. Baker
J. P. Davis

INVENTOR
Franz Schimmel
BY
ATTORNEYS

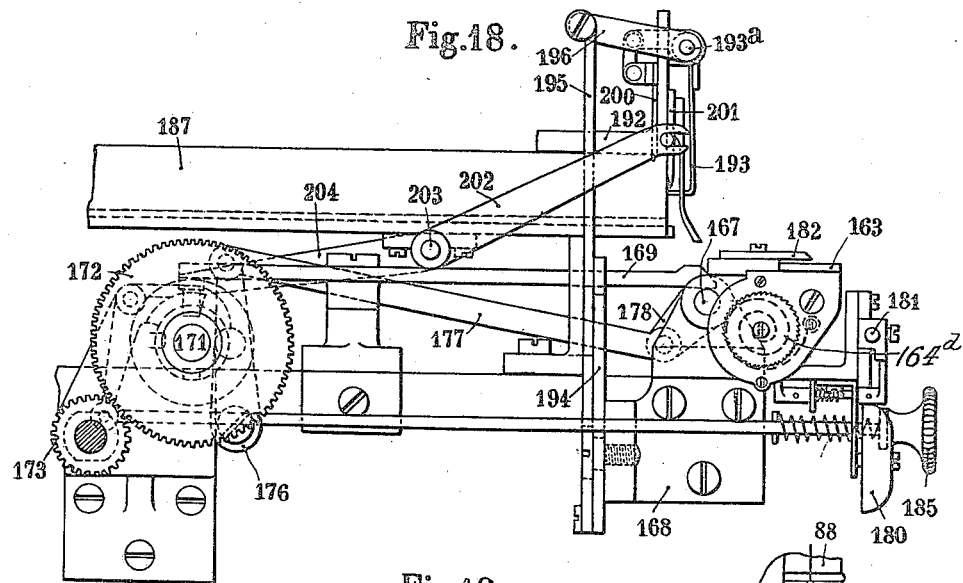
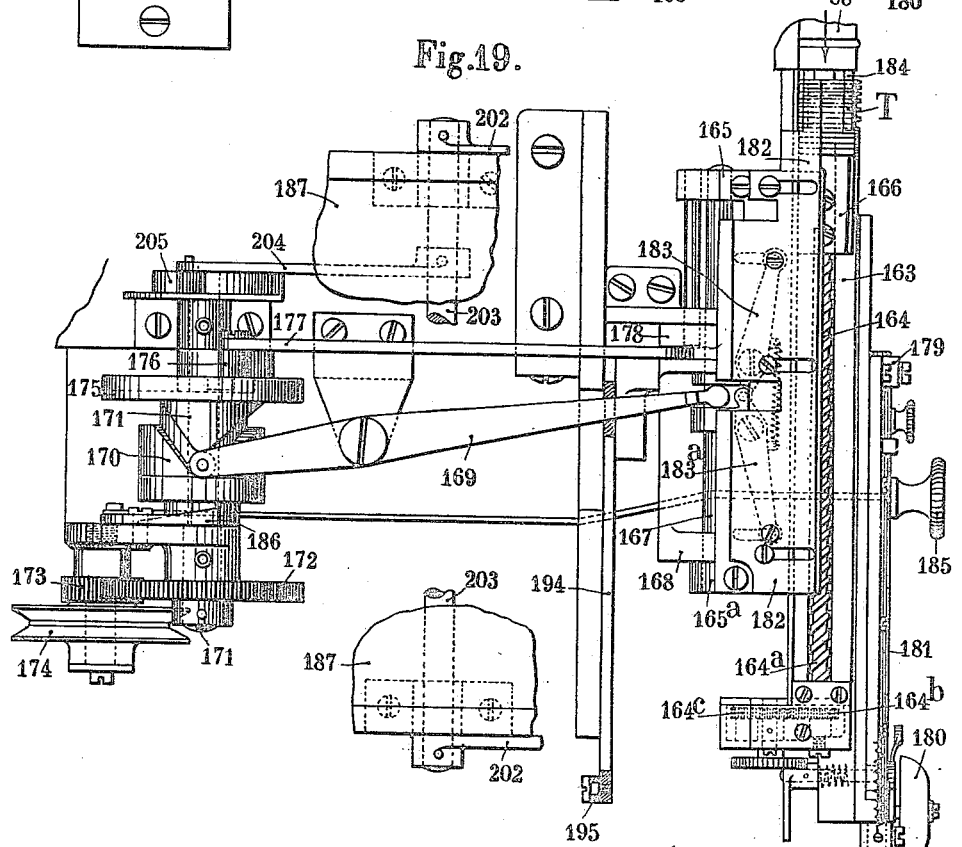

F. SCHIMMEL.
MACHINE FOR CASTING AND COMPOSING SEPARATE TYPE.
APPLICATION FILED JULY 20, 1912.
1,195,742.
Patented Aug. 22, 1916.
15 SHEETS—SHEET 10.
Fig.20.
Fig.21.
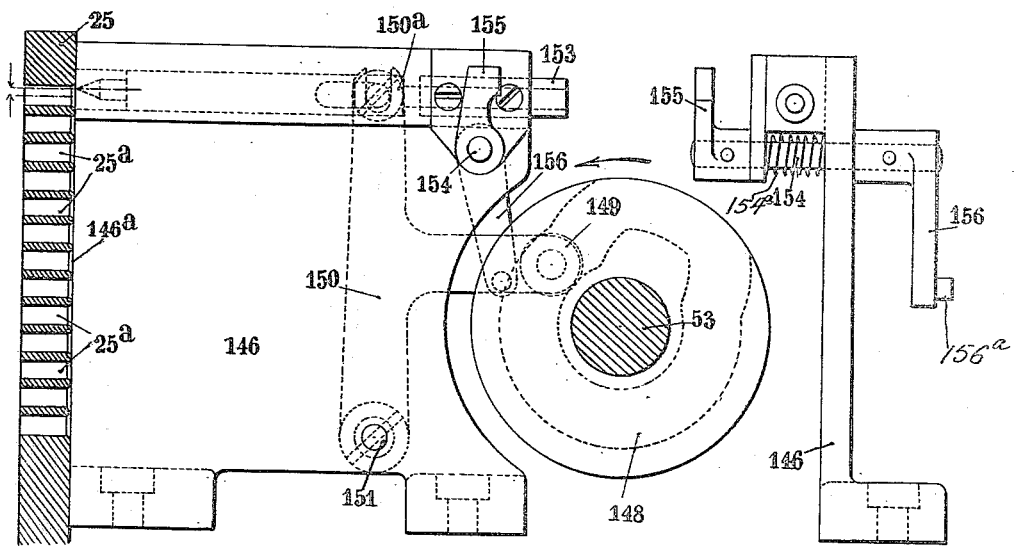
Fig.22.
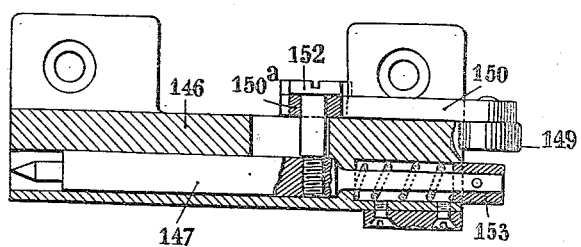
WITNESSES
William C. Baker
J. P. Davis
INVENTOR
Franz Schimmel
BY Munn & Co
ATTORNEYS

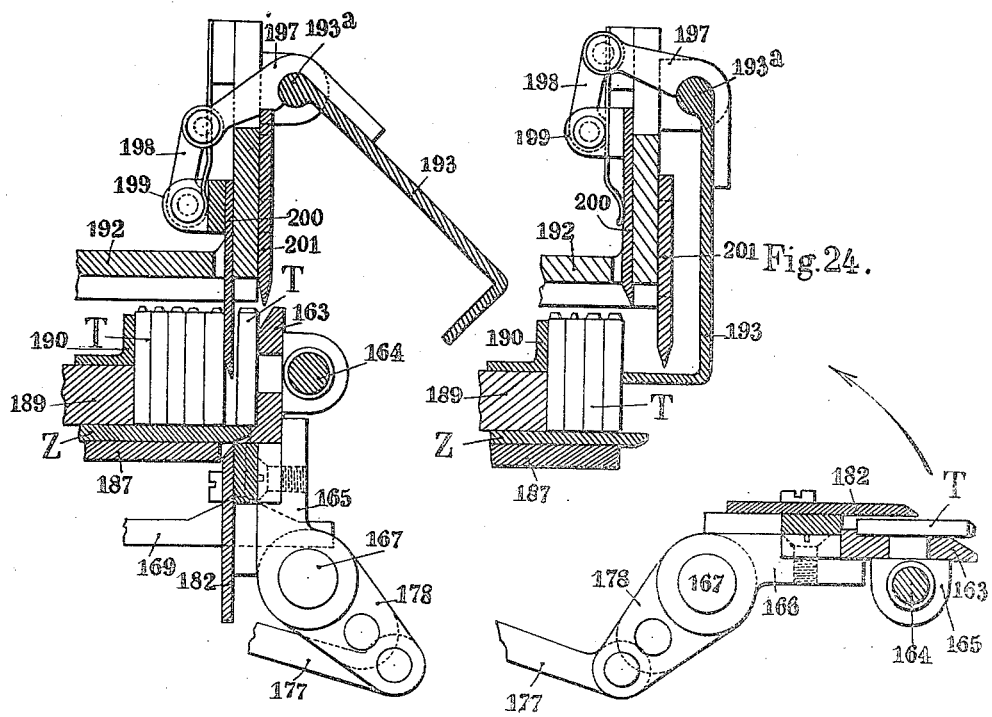

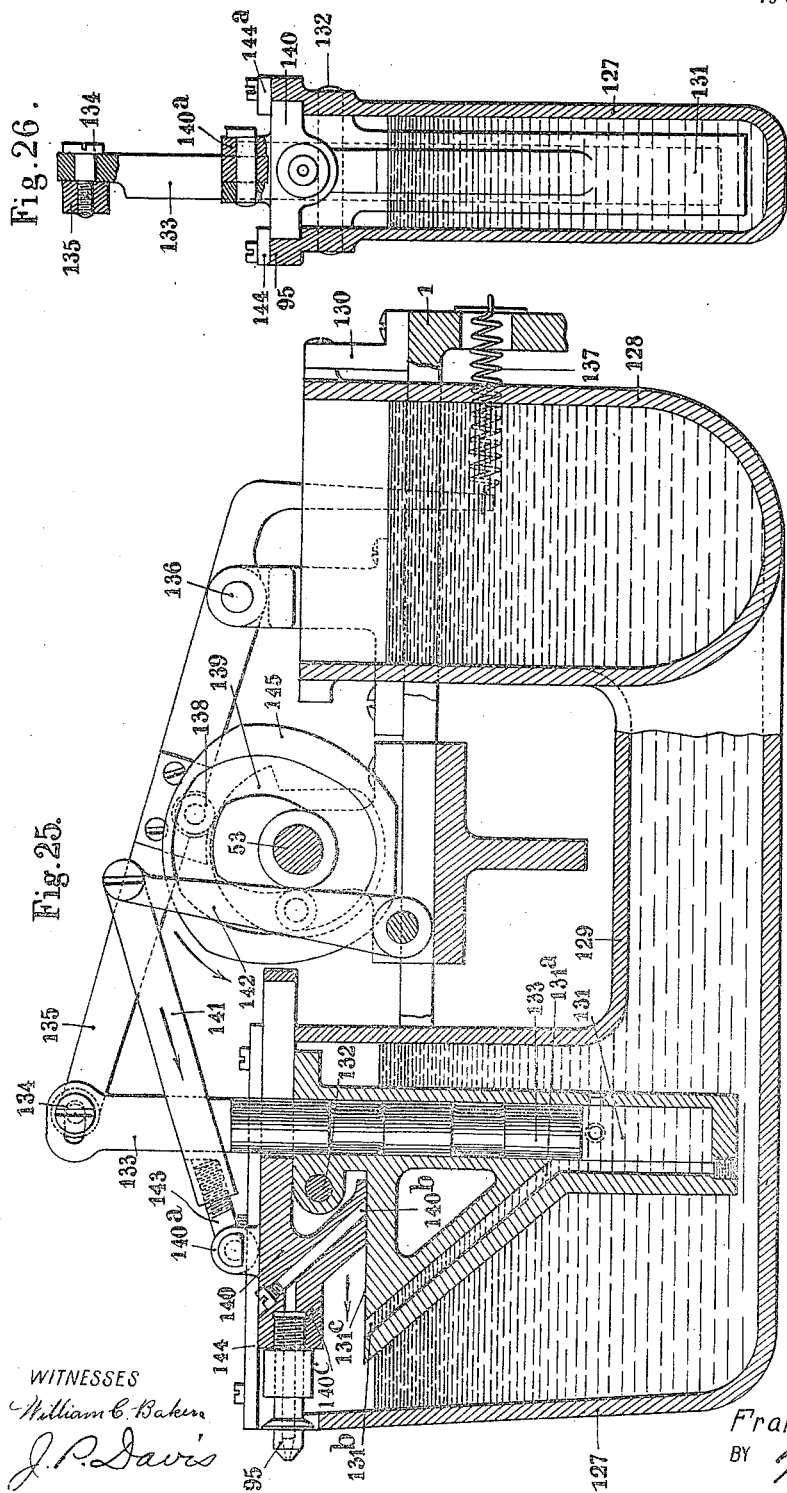

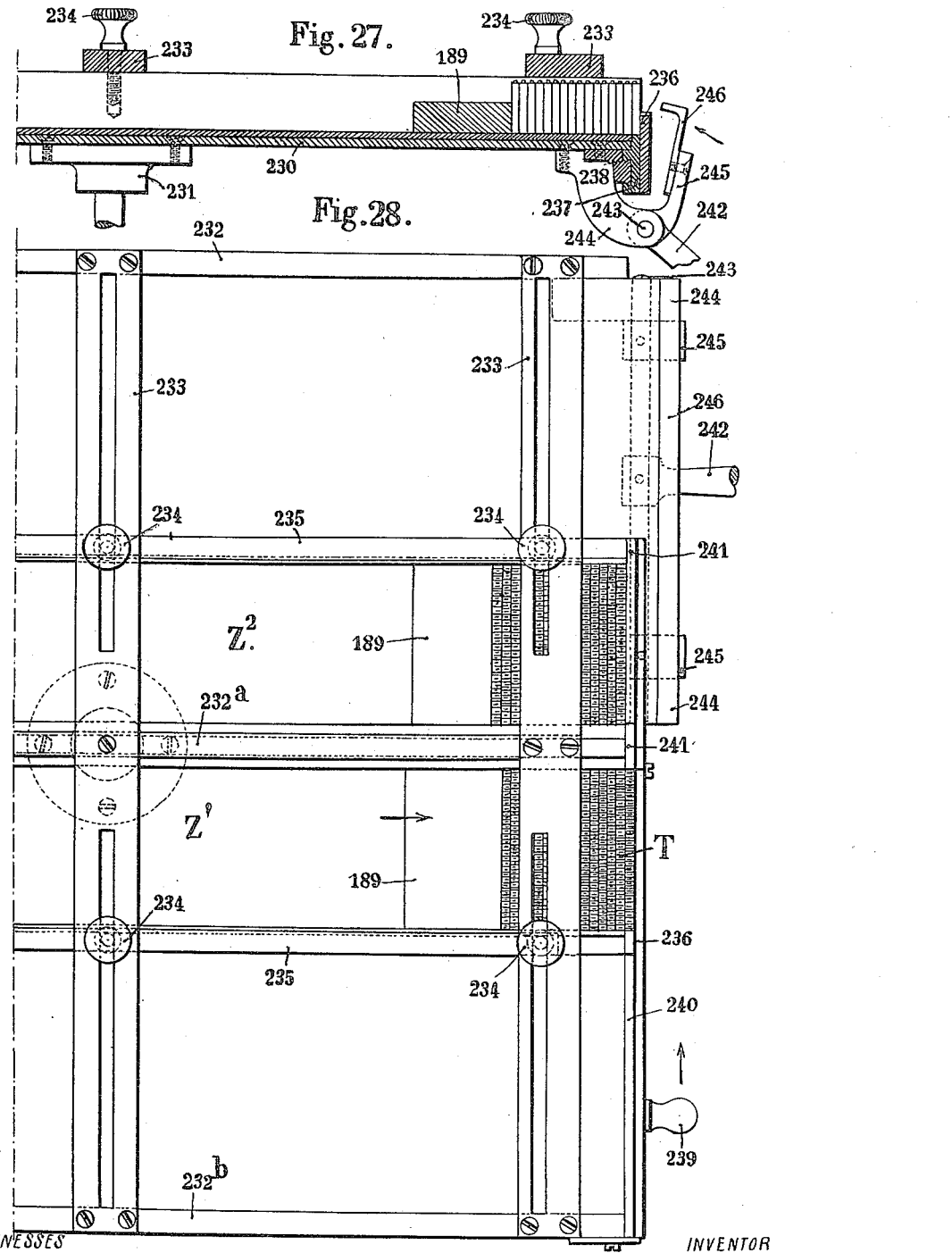

F. SCHIMMEL.
MACHINE FOR CASTING AND COMPOSING SEPARATE TYPE.
APPLICATION FILED JULY 20, 1912.

1,195,742.

Patented Aug. 22, 1916.
15 SHEETS—SHEET 14.

WITNESSES
William C. Baker
J. P. Davis

INVENTOR
Franz Schimmel
BY Munn & Co
ATTORNEYS

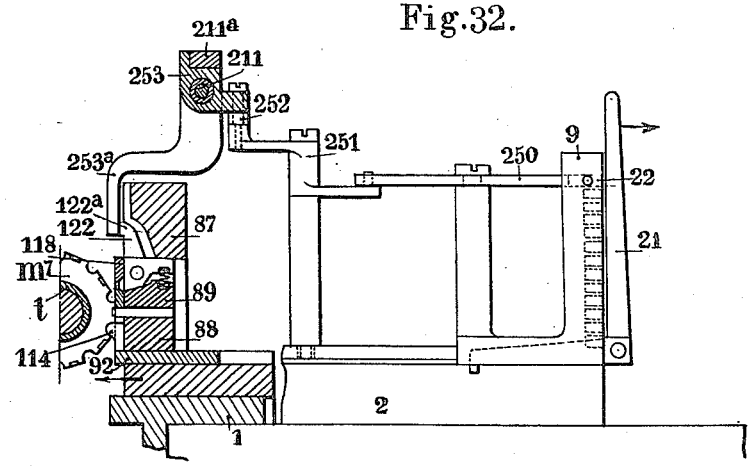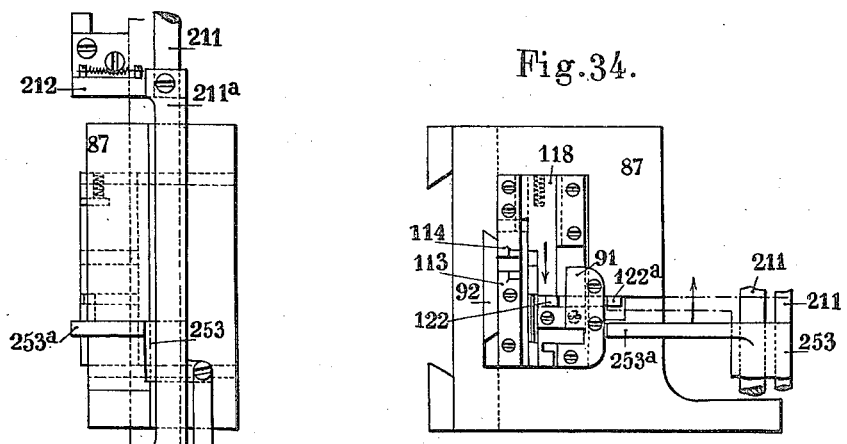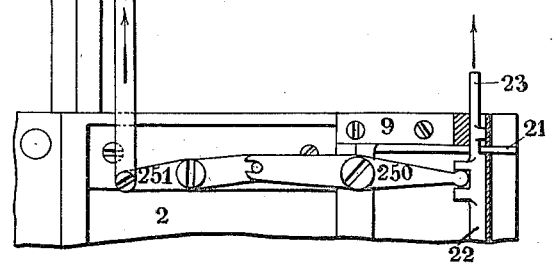

UNITED STATES PATENT OFFICE.

FRANZ SCHIMMEL, OF NANCY, FRANCE, ASSIGNOR TO SOCIÉTÉ MAURICE VELIN & CIE., OF NANCY, FRANCE.

MACHINE FOR CASTING AND COMPOSING SEPARATE TYPE.

1,195,742.  Specification of Letters Patent.  Patented Aug. 22, 1916.

Application filed July 20, 1912. Serial No. 710,608.

*To all whom it may concern:*

Be it known that I, FRANZ SCHIMMEL, a subject of the Emperor of Germany, of 4 Rue Messier, Nancy, Meurthe et Moselle, Republic of France, engineer, have invented Improvements in Machines for Casting and Composing Separate Type, of which the following is a full, clear, and exact description.

In spite of the almost universal vogue of machines for casting lines of type, it is still very advantageous, in certain classes of work, to employ individual type for setting up matter to be printed, for example, for tabular statements, scientific works, illustrated journals and books, and other printed matter which at times requires modifications or final corrections, by reason of the facility with which it can be re-set and corrected when set up in separately movable type. For this reason many inventors have attempted to replace the slow process of manual composition and the consequent distribution, by mechanical work, and thus to increase the rate of production. Now even if they have arrived already at the principles providing a solution of this problem, the machines constructed for this purpose have not been able to be brought into practical use because they are too complicated or too costly and because, in order to work them, it is necessary to buy from the foundries a large number of characters. In order to obviate the inconvenience last mentioned, machines for casting and composing separate types have been constructed, which are ordinarily controlled in operation by a perforated paper band and operate mechanically. The price of such a machine is very high, and it usually required the employment of two persons, one for operating the key board and the second for superintending the casting mechanism. In addition a third person is also employed for removing from the matter set up, any battered or badly cast characters, or to correct badly justified lines and faults made by the operator.

The subject of my herein described invention is a machine for casting and composing movable characters, in which the key board acts directly on the casting mechanism without the interposition of a perforated paper band, the advantage of which is that the assistance of one person can be dispensed with. By reason of a quite novel and particular construction of the melting pot, composing mechanism, and other parts, a machine is provided all the parts of which are readily accessible, and which permits of the employment of a large number of different characters in one line without it being necessary to make modifications in the construction of the machine.

The principal parts of the machine comprise: a machine frame which carries on the right hand side a key board and is provided at its central part with a melting pot, a cam shaft which is put in gear directly by the key board and the disengagement of which is automatically effected after each rotation, and which during each complete revolution, effects the casting and setting up of one letter. At the left hand side of the machine frame are fixed the composing mechanism and a galley for receiving the lines of type set up. At the front of the machine frame is fixed a frame carrying several matrix blocks. One of the latter (the matrices of which serve for composing the matter to be set in type) is always opposite the melting pot, and can be replaced at will by another matrix block in the frame, by means of a simple movement of displacement of the frame which slides on the front of the machine. Between the frame carrying the matrix blocks and the melting pot there is arranged another frame carrying in its interior a movable mold actuated by levers operated by the cam shaft. By this device, the mold is pressed against the matrix block, closes itself automatically and adjusts itself according to the width of the letter or of a space to be cast, the metal is squirted by the pump into the interior of the mold, and the letter or space thus cast is afterward expelled from the mold and alined with the other letters in the composing mechanism.

The operation of the machine is as follows:—By lowering one of the keys of the keyboard, two pins belonging to two different groups of stop pins, unclutch and effect the stopping of two different movements acting on one of the matrix blocks which is actually in use for the time being. This matrix block, placed at the height of the mold, receives a rotary movement on its axis and a reciprocatory movement along this axis. These two movements are interrupted by the two pins hereinabove mentioned, in such a manner that the matrix block is brought to a predetermined position in front of the mold in order that the required letter shall be in position in front of the aperture in the latter. Following the arrest of the block the cam-shaft is coupled with a continuously rotating gearing and moves through a complete revolution after which it is disengaged from the same. During this rotation, by means of levers and other suitable transmission mechanism, the matrix block is locked in the desired position, the mold is pressed against the block and closed, metal is injected into the mold by means of a pump, one half of the mold is carried back with the cast type, the latter is expelled from the mold into the composing mechanism and the two stop pins which lock the matrix block are withdrawn, after which all the levers participating in the movement are returned in their initial positions before the cam-shaft is thrown out of gear and stopped.

In order to avoid harmful shocks which might arise from the sudden stoppage of the matrix blocks, there is provided for both the rotary and the reciprocatory movements of the blocks, a disengaging gear which, at the moment when the desired letter is almost opposite to the mold aperture permits the interruption of the power acting on the block and permits the two pins to effect the immediate stopping of the block without any shock.

The cast characters expelled into the composing mechanism and forming a complete line, are transferred into the galley by a special mechanism and when the column is completed the galley is carried away and replaced by another empty one. As matter thus set up by the machine, is not exactly justified according to typographic rules, there is employed for this last mentioned operation, a justification and correction table into which the galley with the lines composed by the machine can be introduced and present in turn each line to be justified at the end of the galley, so that the operation of justification is facilitated. At the side of the galley containing the unjustified composition, another empty galley is placed, and each line, after justification, is conveyed by simple reciprocatory movements of a slide, into this second empty galley intended to receive the corrected and justified composed type lines. The first line after justification is thus removed and gives place to a second line to be justified, and so on.

Figure 13:
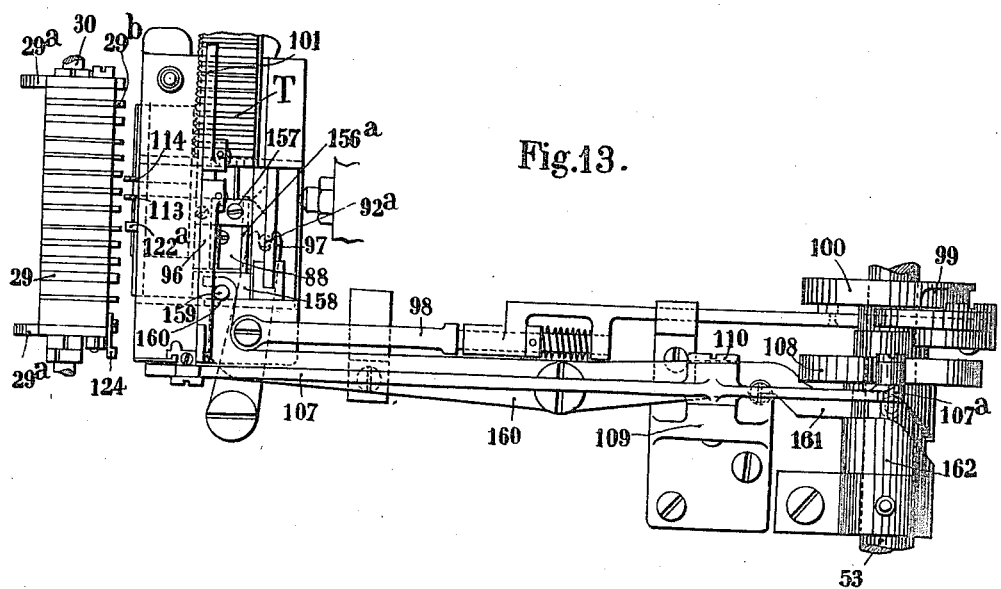
Figure 14:
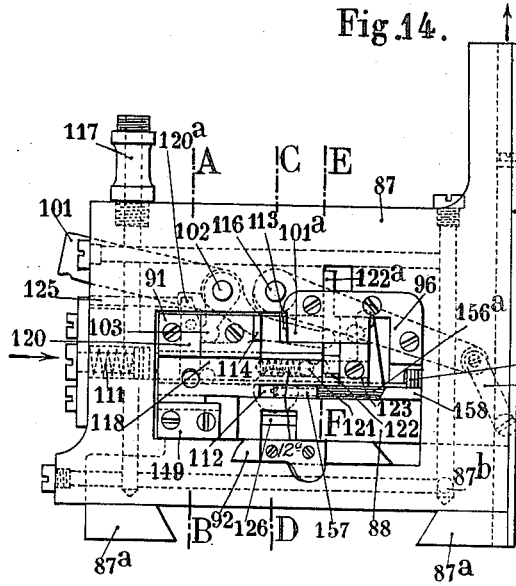
Figure 15:
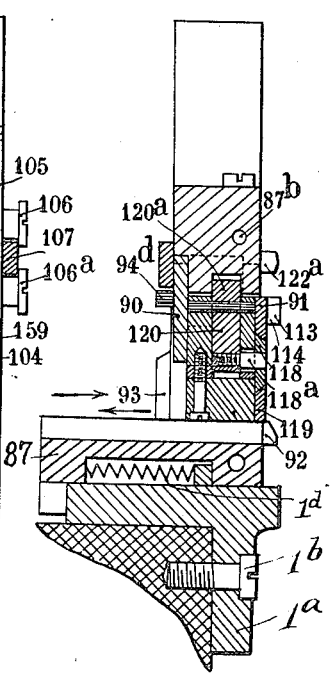
Figure 16:
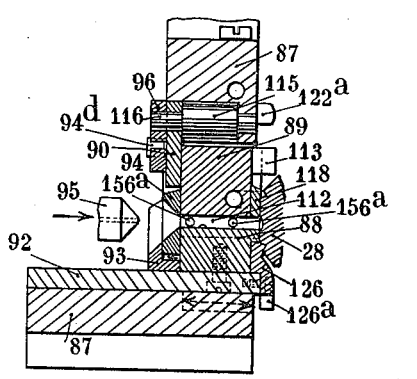
Figure 17:
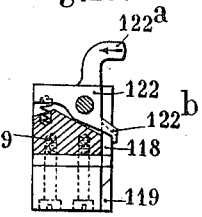
Figure 29:
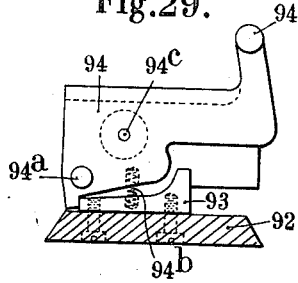
Figure 30:
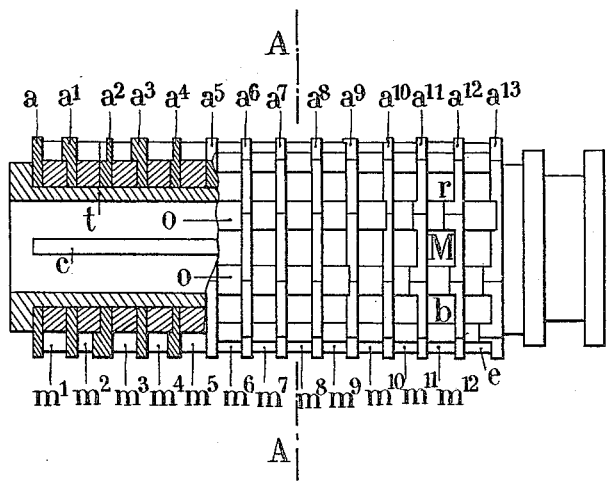
Figure 34:
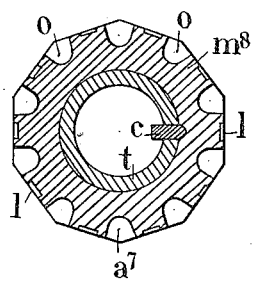

In the accompanying drawings, Figure 1 shows in front elevation the keyboard, the frame, the matrix blocks, the mold, the composing mechanism and the galley. Fig. 2 is a plan view of the machine. Fig. 2ª is a detail view on an enlarged scale of part of the mechanism shown in Fig. 2. Fig. 3 is a side view of the machine. Fig. 4 shows the actuating and clutch mechanism for the matrix blocks, and Fig. 5 is a side view of the same. Fig. 6 shows the mechanism for stopping the rotary movement of the matrix block, and Fig. 7 is a transverse section of the same. Fig. 8 shows the driving and stop mechanism for the reciprocatory movements of the matrix block seen in side elevation, and Fig. 9 is a plan thereof. Fig. 10 is a view of the driving wheel. Fig. 11 shows an arrangement of levers for adjusting the mold to the width of the type or spaces to be cast. Fig. 12 is a side view of the mechanism for effecting the movements of the frame and mold, and Fig. 13 is a plan of the same mechanism. Fig. 14 is a front view of the frame and mold. Fig. 15 is a transverse section taken on the line A—B, Fig. 14. Fig. 16 is a section taken on the line C—D, Fig. 14. Fig. 17 is a section on the line, E—F, Fig. 14. Fig. 18 is a side view of the composing mechanism and galley. Fig. 19 is a plan of the parts shown in Fig. 18. Fig. 20 is a side view of the device for insuring the exact alinement of the matrix blocks in front of the mold aperture, and Fig. 21 is a front view of the same. Fig. 22 is a plan and partial section of the device shown in Figs. 20 and 21. Fig. 23 is a view of the composing mechanism and the galley, in transverse section. Fig. 24 is a similar section showing the composing mechanism in position ready to receive a cast type. Figs. 25 and 26 are detail views of the melting pot and pump. Figs. 27 and 28 are detail views of the justification table. Fig. 29 is a detail view of a trimming knife. Fig. 30 is a side view, partly in section, of a matrix block in an arrangement in which the adjusting comb is dispensed with. Fig. 31 is a section through the block made according to line A—A of Fig. 30. Fig. 32 illustrates the lever device serving to unclutch the space plate on the mold. Fig. 33 shows the same device in plan view. Fig. 34 illustrates the mold frame with the releasing device of the space plate in front view.

On the right hand side of a frame 1 (Figs. 1, 2 and 3), is fixed a keyboard 2 connected directly with the other parts of the machine. This keyboard carries levers 3 provided with keys pivotally mounted on axes 4 which are fixed in the right and left hand walls of the key board. By the depression of a key the second end 3ª of the lever 3 (Fig. 3) is raised and thus raises the transverse bars 5 which transmit this movement to longitudinal bars 6 and to plates 7. The members last mentioned set free two different pins mounted in supports 8 and 9 (Figs. 2 and 3) and which effect the arrest of the matrix block in front of the mold aperture.

The support 8 which is directly connected to the keyboard 2 is shown in the drawing in Fig. 6. The axes of the longitudinal bars 6 pass across the entire width of the keyboard and are lodged at the right hand side in the keyboard itself while at the left hand side they are lodged in the support 8. At this part, they carry levers 10 only one of which is shown in Fig. 6. On this lever 10 rests a pawl 11 pivotally mounted on a bar 12. The left end of this bar forms a round pin 13. The support 8 contains ten bars 12 mounted side by side (Fig. 7), the pawls 11 of which are actuated by ten levers 10 fixed on the axes of longitudinal bars 6; in Fig. 6 the ten axes of the longitudinal bars 6 are indicated by the reference numeral 6$^a$. On depressing a key of any one lever 3, the other extremity 3$^a$ of this lever raises the transverse bar 5 which is guided so that it is raised and at the same time moved forward, at an angle of 45 degrees, and presses against the longitudinal bar 6 which, turning on its axis 6$^a$, raises the lever 10 (Fig. 6) and, through the latter, carries the pawl 11 into the bar 12. The bar 12 is thrust forward by a spring 14 and the pawl, 11, which bears against a plate 15 fixed in the support 8, prevents the bar 12 from advancing until, in consequence of the depression of a key, the lever 10 moves the pawl 11 and permits the bar 12 to spring forward and, in consequence, causes the pin 13 to move out from the support 8. This pin 13 remains in this position until it is retracted by a connecting rod 16 acting on a lever 17 which at its end 17$^a$ engages a second pawl 18 fixed to the bar 12. In the interval the transverse bar 5 in the keyboard is lowered, being no longer thrust by the end 3$^a$ of the lever 3, and thus permits the longitudinal bar 6 to return to the position indicated in the drawing (Fig. 6); consequently the lever 10 is lowered and permits the pawl 11 to engage behind the plate 15 and remain in this position until, on a new depression of a key, the same or another bar 12 is set free and causes the same pin 13, or another of the ten pins contained in the support 8, to move out according to the position of the required character. The purpose of this arrangement will hereinafter be explained.

An analogous device is secured to the rear keyboard and is indicated by the numeral 9 in Fig. 3. This support comprises thirteen bars of which twelve are actuated by the plates 7 and the thirteenth by a lever 19 which is connected to a special key 20; Fig. 9 shows the support 9 in plan and partial section. As shown in Fig. 2, the support 9 is secured directly to the keyboard 2 by means of screws. The plates 7, Fig. 3, which pass across the entire width of the keyboard, and which can be raised parallel to themselves by the transverse bar 5, act on levers 21 which set free bars 22 the left hand extremities of which form pins 23 which can be projected from the support 9 by the thrust of springs 24. Each of the bars 22 is provided with a notch 22$^a$ into which extends the end of a corresponding lever 21 and operates to lock the bars 22 in the position indicated in Fig. 9, in which a plate 7 is also shown, in broken lines. The lever 10, which is not controlled by the keyboard but by the key 20, operates in the same manner as the levers 21. The bars 22 are thrust at their right hand ends by springs 24 and as soon as one of the bars is set free by the lever 19 or by one of the twelve levers 21 the said bar is thrust to the left by the spring 24 and moves out from the support 9. In front of the support 9 opposite to the pins 23 is mounted a slider 25 in which, at a predetermined place, a hole 26 is pierced in which the pins 23 projecting from the apparatus 9 engage when the hole 26 of the slider 25 is brought in front of them. The functional purpose of this apparatus will be hereinafter further explained.

On the front face of the machine frame 1, is fixed a frame 27 carrying five matrix blocks 28 each connected with a comb 29 in such a manner that the block can turn around its axis without being hindered by the comb 29 to which the block communicates only its reciprocatory motion; each comb 29 is guided by a spindle 30 which prevents it from turning with the corresponding block. This arrangement is already known, and it will be sufficient to indicate only the essential operative parts. On the same spindle which passes through the block and which serves as a guide for its reciprocatory movements, at the right hand end a drum 31 is fixed carrying a pinion 32 which transmits rotary movement to the block 28 which is mounted on its spindle by means of a key sliding in a groove in the spindle extending along the whole length thereof. By this means the block is forced to turn with its spindle but it is free to slide so that it can have a reciprocatory movement along the same. These two movements are interrupted at the moment when the required character which is engraved at a predetermined position on the block is brought in front of the mold aperture. The matrix block comprises twelve different matrices each of which serves for casting ten characters. These matrices are separated by steel plates, and in their reciprocatory movement the various matrices travel in front of the mold aperture while, in consequence of their rotary movement, the various letters of each matrix are successively moved past the level of the mold aperture. Under the control of the keyboard, the bars in the two supports 8 and 9 permit the two movements of the block to be stopped, as required, when the desired character is in front of the mold aperture. Reciprocatory movement is transmitted to each block by a lever 33 the extremity of which engages in an annular groove in the block in such a manner as not to hinder the rotary movement of the block. The lever 33 is visible in Fig. 1 and its operating mechanism is shown in detail in Fig. 8.

The lever 33 is mounted on a shaft 34 which passes through the front wall of the machine frame 1, and is guided at its other end in the bearing 35 (Fig. 9). At this extremity of the shaft 34 is fixed a lever 36 which is provided with a roller 37 at its end. This roller 37 engages in the forked extremity of the frame 25 which receives a rising and falling movement from a crank 38, in such a manner that the roller 37 travels up and down along the path indicated by the characters I to XIII. This movement can be interrupted in thirteen different positions by the bars 22 which extend at their extremities in the form of pins into the hole 26 and thus lock the frame in various predetermined positions. Fig. 8 only shows one of the bars 22 but the guideways for the bars 22 are clearly indicated in the support 9 and permit it to be readily understood that the bars 22 are arranged one above the other at predetermined intervals, in such a manner that each of these bars can stop the frame 25 in each of the positions which respectively correspond to the positions of the forked extremity of the frame indicated by the characters I to XIII. Since the lever 33 and the lever 36 are rigidly connected by the shaft 34 common to both, the movement transmitted by the frame 25 to the lever 36 is also transmitted to the lever 33, and it follows that the lever 33 is stopped in a predetermined position, and thus brings one or other of the matrices on the matrix block in alinement with the front of the mold. The several positions of the lever 33 as well as those of the matrix block are indicated by the characters I' and XIII.

Movement is transmitted to the crank 38 by a pulley 39, driven by a belt pulley 40, in such a manner that the pulley 39 is unclutched at the moment when the pin-shaped end of a bar 22 enters into the hole 26. This result is attained by means of a special arrangement illustrated in Figs. 8 and 9. As mentioned above, when a key of the keyboard is depressed, one of the bars 22 is set free by the pawl 21 and is thrust by the spring 24 against the frame 25 which moves up and down until the hole 26 is brought into position opposite the pin protruded and the pin then enters the hole 26. Mounted on each of the bars 22 is a hook 41 (Fig. 9) which draws with it in its movement toward the left, an oscillating bar 42. This bar is hung on a shaft 43 and is engaged in the manner shown in Fig. 9, by the thirteen hooks 41 of the bar 22. A plate 44 which is suspended from a pivot 45 (Fig. 8) has a portion projecting beyond the end of the pivot 45 at one side and which presses against the back of the bar 42. The lower extremity of the plate 44 can move freely and exerts pressure upon a fork 46 (Fig. 8) which is in engagement with a toothed clutch sleeve 47, and is guided at the upper extremity by a pin 48 which slides centrally in a hollow shaft on which a pinion 49 is mounted. When the oscillating bar or lever 42 is moved toward the left as above described, it moves the oscillating plate or lever 44, which bears against it, toward the left, and as the plate or lever 44 presses against the fork 46, the clutch 47 is moved to the left away from the pulley 39.

The pulley 39 is loose on a shaft 49ª and is provided at its left hand extremity with a toothed clutch sleeve which engages the sleeve 47, in such a manner that these sleeves rotate together until the plate 44 commences to exert pressure on the fork 46, the result of which is that the sleeve 47 is moved to the left away from the pulley 39 which continues to rotate freely. The sleeve 47 bears at its other end 47ª, a series of teeth which gear with the pinion 49 and, since the latter is keyed to the shaft 50, and the crank 38 is keyed to the same shaft, the said crank is driven by this rotary movement. The frame 25, to which the crank 38 is connected by a connecting rod 51, consequently receives a vertically reciprocating motion.

The same belt pulley 40, Fig. 3, through a second belt, drives the pulley 52 which is mounted to turn freely on a shaft 53, and bears upon its right hand side a pinion 54 (Fig. 3). The pinion 54 transmits motion to a second pinion 55 which is mounted on a shaft 56 located above the shaft 53 parallel with the latter (Fig. 2). The shaft 56 is mounted in bearings 57 and 58 and on this shaft in addition to the pinion 55 is mounted a clutch sleeve 59 which, at its right hand end, is provided with ordinary teeth forming a pinion 59ª and on the left hand end with clutch teeth which come into engagement, at the desired moment, with corresponding clutch teeth on a sleeve 60. The sleeve 60 is acted upon by a spring which brings it into engagement with the teeth on the sleeve 59. The sleeve 60 is coupled to the shaft 56 by a pin 61 which permits it to move along the shaft 56 and engage the clutch teeth on the sleeve 59. The pulley 52 rotates continuously and transmits its rotary motion to the pinion 55 which results in the shaft 56 being kept in constant rotation.

The shaft 56 drives the sleeve 60 through the pin 61; on the other hand the sleeve 59 remains at rest until it is set in motion by the sleeve 60 coming into engagement with it, and then its right hand toothed end sets the driving wheel 62 in rotation. The driving wheel 62 is keyed on the cam shaft 53 and as soon as the clutch parts are moved into engagement, the driving wheel 62 is set in rotation. The sleeve 60 is then moved to the left and disengaged from the sleeve 59 which thereupon comes to rest and the cam shaft 53 also ceases to rotate. The disengagement of the clutch parts is effected by a lever 63 of suitable length (Figs. 2ª and 3), which is fixed on a standard 64 by means of a screw 65. On this lever 63 (Figs. 2 and 2ª) is fixed a roller 66 which engages between cheeks on the sleeve 60 and moves it to right and left thus throwing the clutch into and out of engagement. The lower end 63ª (Fig. 8), of the lever 63 is detained by a pawl 67 in a predetermined position, so that for a time, the sleeve 60 is also detained in the position shown in Fig. 2. The tail 67ª of this pawl, 67, Fig. 8, is in contact with a block 68 which is movable on the shaft 50 and after the plate 44 has been pressed against the lever 46 and has consequently effected the disengagement of the sleeve 47 from the pulley 39, the pin 48 fixed to the lever 46 presses on the pin 69 fixed in the block 68 and consequently moves the latter to the left. This causes a depression of the tail 67ª of the pawl 67 so that the lever 63 is set free, permitting the sleeve 60 to come into engagement with the sleeve 59. As has been herein above stated, this results in a rotary motion being transmitted to the driving wheel 62 whereby a block 69ª fixed to this wheel (Figs. 9 and 10), is caused to press on the lug 63ᵇ (Fig. 8), moves the latter to the left and separates the sleeve 60 from the sleeve 59; the pawl 67 then brings the lever 63 to rest in its initial position. These operations are repeated at each release of a bar 22 and only at the moment of engagement of one of the round pins 23 in the hole 26 in the frame 25; in other words, as soon as the matrix block 29 is brought to rest, in a predetermined position, by the mechanism above described the cam shaft is also thrown into gear and turned through one revolution. It is then automatically thrown out of gear again until the matrix block is again stopped in another position.

As hereinabove mentioned the matrix block 28, in addition to its reciprocating motion, also has a rotary motion which is transmitted to the matrix block shaft by the pinion 32, which is keyed on the said shaft. The motion is transmitted through an intermediate pinion 70, Fig. 2, which is driven by a second pinion 71. The latter is mounted on the same shaft as a pulley 72 which is driven, by means of a belt, by a pulley 73 keyed on the shaft 56; as already stated the shaft 56 has a constant rotary motion which is transmitted intermittently to the sleeve 59, while the pulley 72 is rotated continuously. In order that motion may be transmitted to the pinion 32 and to the matrix block there is arranged at the side of the pulley 72 a clutch sleeve 74 which is thrown out of gear at the moment when the stop pin 13 on the support 8 passes into a hole 31ª in the drum 31. Fig. 4 shows the pinions 32, 70 and 71 in engagement and it also shows the sleeve 74 in a position permitting the pulley 72 to turn freely on the shaft 75. The sleeve 74 is in this position each time that a pin 13, Fig. 6, is in engagement with the corresponding hole 31ª in the drum 31. When a pin 13 moves out from the support 8, the lever 17ª is moved by the pawl 18, as mentioned above, and the lever 17, by means of its forked end 17ᵇ which embraces the pin 76, actuates the lever 77, Figs. 4 and 5, and causes it to move in the direction indicated by an arrow in Fig. 5. The lever 77 bears, at its central part, a pin 78 which extends into a rod 79 and passes through a connecting rod 77ª the end of which is pivotally connected to a bent lever 80 which is acted upon by a spring 81 and, as the lever 80 by means of its finger 80ª drives the sleeve 74, this lever effects the movement of the clutch into and out of its operative position. When a pin 13 is advanced, the lever 77 is moved in the direction of the arrow Figs. 4 and 5. Previously the rod 79 has moved forward and has allowed the bent lever 80 to turn about its fulcrum under the action of the spring 81, and throws the sleeve 74 out of engagement. At this moment, since the pin 13 has passed into the hole 31ª of the drum 31, the latter can no longer continue its rotary movement, and because the pulley 72 has also been thrown out of gear and turns freely on the shaft 75, the motive power ceases to act on the pinion 32 and on the drum 31. Consequently the drum 31 is stopped without shock. The whole of the mechanism just described is mounted on a plate 82 which is screwed to the frame 1.

The return movement of the pin 13, that is to say of the bar 12, is effected by the cam 83, Fig. 2, by means of the connecting rod 16 acting through the lever 17, one end 17ª of which engages behind the pawl 18 (Fig. 6) and brings back the bar 12 with its pin 13 into its initial position wherein the pawl 11 engages behind the plate 15, and retains it in this position. As shown in Fig. 6, the pawl 18 can be withdrawn entirely within the recess formed in the bar 12, in order that the bar 17ª shall act only on the pawl 18 of a particular bar 12 which has been thrown out of gear or unlocked, without catching the others. In fact, as has been already mentioned, the support 8 contains ten bars 12 each of which bears a pawl 18. All these ten pawls are acted upon by an adjustable spring 86 by means of a lever 84 which turns idly about a shaft 85 on which is keyed the lever 17, the action of the spring being such that the front ends of the pawls are raised whereby when a bar 12 moves forward its pawl comes into engagement with and drives the bar 17ª. In order to bring back the bar 12 into its initial position, the cam 83 pushes forward the lever 87*, Fig. 2, and the rod 16 connected to this lever; the bar 17ª then pushes back the pawl 18 and thus brings the bar 12 back to the rear, but as in this movement the head 16ª of the connecting rod 16 commences to press on the other end 84ª of the lever 84, the spring 86 is stressed and the tooth 84ᵇ on the lever 84 rises slightly above the pawls 18 and allows them to rise in such a manner that the projecting ends of these pawls, which are near to the bar 17ª descend. Since the pawl on any bar 12 which is carried forward is disengaged from the tooth 84ᵇ and is in engagement with only the lever 17ª, during the return or rearward movement of the bar 12 which has been released, the pawl 18 on this bar alone is then caught by the lever 17ª which does not engage any of the other pawls 18. This arrangement has for its object to prevent the levers 17 and 17ª from being subjected to excessive stresses at the ends of their path of travel, as would occur if the bar 17ª were to stress the springs 14 of all the bars 12 at once.

The casting mechanism comprises a supporting carriage 87 (Figs. 14 to 16) in which the lower part 88 of the mold can move to and fro as indicated by the arrows in Fig. 15; the upper part 89 (Fig. 16) can only be moved in the plane of the carriage and is movably held between plates 90 and 91. Fig. 16 shows the mold carriage 87 in section as well as the upper and lower parts of the mold which is shown in position for casting type. The lower part of the mold is mounted on a carriage 92 which has a reciprocatory movement in the carriage 87. To the lower part 88 of the mold is rigidly fixed a plate 93 (Figs. 15 and 16). Between this plate and the mold 88 is a slidable strip 94 which bears accurately against the two parts 88 and 89 of the mold at their rear end and has a conical hole in which the mouth 95 of the casting pump exactly fits. The strip 94 is movable vertically and, after the casting of a type, it is lowered by a lever 96 (Fig. 12), and thus cuts off the jet or fin adhering to the cast type in such a manner that the base of the type is perfectly flat.

The lower part of the mold is actuated by the lever 97 (Fig. 13), which is connected by means of a spring connecting rod 98 and a lever 99 to the cam 100 and, according to requirements, moves the lower part of the mold into the carriage 87 or withdraws it therefrom. The lever 97 embraces the pin 92ª fixed in the carriage 92 supporting the lower part of the mold and thus imparts to this lower part a reciprocatory movement in the carriage 87. On the carriage 87 are mounted two levers 96 and 101 (Fig. 14).

These two levers serve to effect the opening and closing of the mold and the lever 96 also serves to trim the cast type as has been mentioned above. The lever 101 is keyed on a shaft 102 (Fig. 14), which carries a second lever 103 one end of which supports the upper part of the mold in the position providing the greatest extent of opening of the mold. This lever 101 has two arms of which one 101ª (Fig. 14), engages beneath the lever 96 which is connected by a connecting rod 104 to a slide 105 which has a vertically reciprocating motion. In the slide 105 are fixed two screws 106 and 106ª between which extends a lever 107 which is actuated by a cam 108 shown in Fig. 13. The lever 107 has two arms and is mounted to oscillate on a pivot 110 screwed into a support 109. At the desired moment, when the roller mounted at the end of the shorter arm slides on the cam 108, the other end of the said lever 107 rises and brings the slide 105 into the position shown in Fig. 12. At the same time, as the slide 105 rises the connecting rod 104 (Fig. 14) is also raised, as well as the lever 96. This last mentioned lever, when it rests on the end 101ª of the lever 101 keeps open the upper part 89 of the mold which tends to close in the direction indicated by the arrow, since it is acted upon by a spring 111 provided in the carriage 87. As soon as the lever 96 rises and releases the lever 101ª, the upper part of the mold is set and moves to the right. The lower and upper parts 88 and 89 of the mold have squared contact faces and in the open position they form a square opening as shown at 112 in Fig. 14. By movement of the upper part of the mold the size of this opening can be varied whereby type of various thicknesses can be cast by squirting metal between the two parts of the mold. The upper part of the mold 89 is guided between the plates 90 and 91 of which one plate 91 carries a projection 113 (Fig. 15). This projection is arranged opposite to a second projection 114 which is screwed to the upper part of the mold and moves with it to the right and left. In the movement to the right of the upper part of the mold, by which movement the opening 112 is made smaller, the projection 114 is moved toward the projection 113. The function of these two projections 113 and 114 is to regulate the degree of closure of the two-part mold according to the size of the type to be cast. The width of the type to be cast is determined by the comb 29. Figs. 12 and 13 illustrate the manner in which this result is obtained. The matrix disks comprised in the block 28 and in the faces of which are stamped or engraved the character molds from which the faces of the type are cast, are mounted on a sleeve 28ª and are held in position by a nut 28ᵇ. The sleeve 28ª can be moved along its shaft 28ᶜ and is rotated therewith by a feather 28$^d$; the comb 29 carries at each of its ends, a lateral forked plate 29$^a$ which embraces the nut 28$^b$ and is carried along by the latter. With this construction the rotary movement of the matrix block is not transmitted to the comb 29 since the latter is guided by the rod 30 and only participates in the longitudinal movements. The matrix disks comprised in the block 28 have different thicknesses according to the character molds stamped or engraved on the faces thereof. These matrix disks are separated by plates or washers interposed in such a manner that they are not in contact with each other. The comb 29 is also constructed in an analogous manner; it is formed of steel plates the thickness of each plate corresponding to the thickness of the matrix disk beneath it. These plates project toward the mold and are provided with teeth 29$^b$.

When the mold is in the position of rest, and the matrix block 28 with the comb 29 receives a reciprocating movement in front of the mold, the teeth 29$^b$ pass in front of the mold carriage and in front of the projections 113 and 114 without touching them. When the matrix block is stopped in a position determined by the depression of a key, the mold carriage is advanced by the tooth 98$^a$ on the spring rod 98 (Fig. 12), so that one of the teeth 29$^b$ of the comb enters between the projections 113 and 114, as shown in Fig. 12. At this time the slide 105 receives an upward movement through the lever 107 which causes a horizontal movement of the upper part of the mold and also of the projection 114 which thrusts the said tooth 29$^b$ against the projection 113. It follows that the mold can only close to the extent permitted by the projections 113 and 114 and the teeth 29$^b$, and since the latter have the same thickness as the matrix disk located beneath them, the mold is closed to a width corresponding to the thickness of the said matrix disk. In order to permit the forward movement of the mold carriage, this carriage is provided on its lower face with two guide surfaces 87$^a$ (Figs. 14 and 15) whereby it is guided on a guide plate 1$^a$ secured by a screw 1$^b$ to the frame 1. The return or rearward movement of the mold carriage is effected by a spring 1$^d$ (Fig. 15) arranged in the interior of the mold carriage 87. In order that the two parts of the mold may join together exactly when the mold is closed, there is provided above the upper part 89 of the mold an eccentric or cam 115 (Fig. 16) on a shaft 116 on which the lever 96 is also mounted. During the upward movement of the lever 96, the upper part 89 of the mold approaches the lower part, as above mentioned, and at the last moment the eccentric 115 comes into operation and presses on the upper part of the mold which is thus clamped firmly against the lower part 88 of the said mold and insures a tight joint.

The strip 94 which serves as a knife for trimming the base of the type, is shown in Fig. 29. It oscillates about a pivot 94$^a$ fixed in the plate 93 and is kept raised by a spring 94$^b$ in such a position that the jet aperture 94$^c$ coincides with the center of the interior space of the mold. After a type is cast, the descent of the slide 105 (Fig. 14), by means of the lever 107, also causes the descent of the lever 96 which then imparts a rotary movement to the strip or knife 94 about the axis 94$^a$ in such a manner that the squirting aperture 94$^c$ descends and the knife by means of its interior cutting edges trims off the fin adhering to the type. When the lever 96 again rises, the pin 94$^d$ is relieved from all pressure, and the knife is brought back very rapidly under the action of the spring 94$^b$ in such a manner that the cut off end of the type is also rapidly ejected and the aperture is freed for a fresh squirting operation.

In order that the parts of the mold may not become excessively heated by the squirting of the molten metal, a system of channels or conduits 87$^b$ is formed in the mold carriage 87 to permit circulation of cooling water therein; these holes form a passage through the carriage in which cold water is continually circulated to carry away heat from the carriage as well as heat from the removable parts of the mold. The connection for the inlet of water is made by means of a pipe 117 (Fig. 14). The water after circulating through the conduits 87$^b$ passes out at the lower part of the mold carriage; the outlet is not shown in the drawings.

The spaces employed when composing with separate type are of much less height than the ordinary character type, this reduction being equal to the depth of the character configuration stamped or engraved in the matrix, in order that the ends of the spaces between the words, shall not be flush with the printing surface, otherwise they would produce an impression on the paper. In the existing type casting and composing machines with separate type, the spaces are cast with a height equal to that of the shank of the type since the casting of short spaces by means of the same mold as that employed for the casting of the character type presented very great difficulties and it is only quite recently that this problem has been solved. The mold above described solves this problem in a very simple manner for it permits short spaces to be cast equally as readily as character type. The upper part 89 (Fig. 15) of the mold bears on its front face a plate 118 which is retained by the plates 91 and 119, forming a dove-tail guide for the said plate 118. The depth of the upper part of the mold is less by the thickness of the plate 118 than the depth of the lower part 88 of the mold, and since the plate 118 can move horizontally on the upper part 89, it can cover the space 112 without the upper part being moved; the plate 118 thus forms a slide which closes the front of the two parts of the mold, in such a manner that the metal squirted in cannot pass into the intaglio part of the matrix and can only flow as far as the plate 118 and consequently forms a space which does not include any character on its front end and is moreover shorter by the thickness of the plate 118 than the shank of the type. This plate 118 is provided in the front with a hole into which extends a pin 118ª which is fixed on lever 120, Fig. 15. The plate itself carries on its inner side a second pin 121, Fig. 14. A spring 121ª, which is supported by the upper part 89 of the mold, acts on this pin 121 which is riveted into the cover plate 118 and thus closes the aperture 112. This aperture however should only close completely when it is desired to cast a space. For this purpose there is arranged in front of the plate 118, a lever 122, Fig. 14, which is pivotally mounted on the upper part of the mold. This lever extends between the plate 123 screwed to the upper part 89 of the mold and the cover plate 118 in such a manner that the latter is held by the bolt end 122ᵇ of the lever in a position in which the faces thereof which serve to form the aperture of the mold for the casting of characters form extensions of the corresponding interior faces of the upper part of the mold. The upper end 122ª of the lever 122 (Fig. 17) projects above the projections 113 and 114 and comes into contact not with the teeth 29ᵇ of the comb but with a plate 124 (Fig. 13), which is set in front of the end 122ª of the lever when it is desired to cast spaces.

By the forward movement of the mold carriage, and by the resistance offered by the plate 124, the lever end 122ª (Fig. 17) is pushed back to the rear in the direction indicated by the arrow, and thus cover plate 118 is permitted to move in such a manner that the mold is closed by the plate 118. When the casting is completed the plate 118 is brought back to its initial position by the lever 120 (Fig. 15), the upper end 120ª of which abuts against a screw 125 arranged on the carriage 87 and moves the plate 118 to the rear in such a manner that the lever 122 can again engage between the cover plate 118 and the fixed plate 123.

In order to compensate for possible differences in the position of the block and in order to bring the face of the types into the proper position relatively to the shank, there is screwed on the lower part of the mold a pin 126 (Figs. 12 and 16), which extends into a notch formed in the matrix block, and thus insures the position of the block relatively to the mold. At this lower end this pin has a projection 126ª (Fig. 16), which serves as an abutment for the lower part of the mold during the return movement; this projection enters a recess in the mold carriage and thus limits its path of travel, as indicated by two arrows in Fig. 16. The casting of the type is effected by a group of mechanism shown in plan in Fig. 25. The melting pot comprises a front part 127 and a rear part 128; these two parts which are cast in one piece are in communication with each other at the bottom through a passage 129. The melting pot proper is fixed on the frame 1 by means of standards 130. The pump proper 131 is mounted in the front part 127 of the melting pot on a horizontal shaft 132 in such a manner as to be capable of oscillating about this shaft, this movement being caused partly by the friction of a piston 133 as it moves in the pump cylinder, and partly by the resistance of the metal beneath the piston and which is to be pumped through the passage 131ª toward the aperture 131ᵇ. The piston 133 is connected by a screw threaded rod 134 to a lever 135 which oscillates about a shaft 136 and at its other end is acted upon by a spring 137 attached to the frame 1 or to a lever by means of which its tension can be adjusted. The pump lever 135 is provided with an antifriction roller 138 traveling on a cam 139 indicated in the drawing in dotted lines. This cam allows the lever to descend at the desired moment; the piston 133 then descends and expels the molten metal. Above the pump 131 is arranged a carriage 140 having a reciprocatory motion and which can be moved into contact with the mold. Motion is transmitted to this carriage by means of a connecting rod 141 and a cam lever 142. The carriage is connected to the rod 141 by a screw-threaded member 143 which permits regulation of the pressure of the mouth-piece 95, against the mold. The member 143 is pivotally connected at 140ª to the carriage 140 which is guided in the front part of the melting pot, as shown in Fig. 26, and plates 144 and 144ª prevent it from rising. When the shaft 53 turns, the cam 145 first moves forward the lever 142 in the direction indicated by the arrow and with it the carriage 140 at one end of which the mouth 95 is formed. The passage 140 thus comes into alinement with the aperture 131ᵇ of the conduit 131ª from the pump and forms a prolongation of this conduit 131ª extending to the mouth 95 and conveys the molten metal. The under side of the slide 140 and the surface 131ᶜ on the pump on which it travels are accurately fitted together so that when the slide 140 has its aperture 140^b above the passage 131^b, the fluid metal cannot escape laterally but passes into the passage 140^b and is squirted out through the mouth piece 95. Fluid tightness between these two faces is further insured since the downward movement of the piston 133 causes the pump to oscillate and the surface 131^c is thus raised and comes against the slide 140 which cannot rise since it is prevented by the plates 144 and 144^a.

The advantages of this arrangement is as follows:—The metal to be cast is introduced into the rear part of the melting pot 128 so that the impurities which are liable to be introduced with the metal or which separates from the metal, remain floating on the surface in this rear part while only the pure metal is brought to the pump through the passage 129 formed at the bottom. The pump 131 although it can oscillate about the axis 132, hardly makes any movement and thus cannot splash or throw the fluid metal, out of the melting pot as would probably happen if the pump participated in the movement of the carriage 140. By the arrangement of the pump on a horizontal shaft 132, complete fluid tightness between two bearing surfaces of the pump and of the melting pot is insured, and the mass of the movable parts, by making the carriage separate from the pump, is reduced to such a degree that it becomes possible to work the carriage at a comparatively high speed without causing any inconvenience to the mechanism as a whole. The special form of the melting pot also enables the main shaft 53 to be arranged between the chambers 127, 128 of the melting pot so as to reduce the width of the front part to a degree such that a sufficient space is obtained around this front part to enable the necessary mechanism for the casting and composing operations to be arranged there.

The mechanism above described serves to move the matrix block and to stop with the desired character in front of the mold aperture, to press the mold against the block, to close the mold and to cast type. In addition to these mechanisms the machine also comprises other devices which insure the position of the matrix block in front of the mold and prevent the main shaft 53 from coming into operation before the two movements of the matrix block are complete. Further the machine also comprises a device for ejecting the cast type, a composing mechanism, and a galley for receiving the composed types.

The arrangement for insuring the position of the matrix block in front of the aperture of the mold, comprises a standard 146 which is fixed on the machine frame at the side of the support 9 (Fig. 2). The frame 25 (Fig. 8) slides up and down on the front face 146^a, Fig. 20, of the standard 146 and it is stopped by a pin 23 in a predetermined position as mentioned above.

In order that the pin 23 shall with certainty enter into the hole 26 of the frame 25, the diameter of the hole 26 is kept appreciably larger than that of the pin 23. This is absolutely necessary in order to permit the stoppage of the frame 25 which moves up and down with some velocity. But by reason of the play which is allowed by the hole 26, the frame 25 can remain stopped in a position which is either too low or too high and, consequently, the position of the matrix block in front of the aperture of the mold is inaccurate. In order to correct for this cause of inaccuracy, there is provided in the standard 146, a plunger 147 (Fig. 22), which is accurately guided in the standard and is pointed at its front end. Under the action of the cam 148 mounted on the cam shaft 53, bent lever 150 provided with an antifriction roller 149 engaged by the cam, is pushed forward and, turns about a pivot 151, so that since it is connected at its upper end 150^a by a screw-threaded rod 152 to the plunger 147, this plunger also receives a forward movement and its pointed end then passes into one of the thirteen holes 25^a formed in the frame 25 so as to bring the said frame into the exact position in which it is required that it should be brought to rest. Fig. 20 indicates an inexact position of the frame 25, which permits a precise idea to be obtained of the manner in which the exact adjustment of the frame is effected. On the other end of the plunger 147 is fixed a collar 153 against which a spiral spring acts to bring the plunger 147 back to the rear as soon as the cam 148 permits. This arrangement insures the position of the matrix block in a longitudinal direction but, as the block also effected a rotary movement and as it is stopped in an analogous manner and is consequently also inexact, there is fitted to the lower part 83 of the mold (Fig. 16) a projection 126 which insures accuracy of the matrix block in the rotary direction.

As the interruptions of the reciprocatory and rotary movements of the matrix block are not always produced at the same moment, it has been necessary to adopt means for preventing the throwing into gear of the cam-shaft 53, before the two movements are both interrupted. This result is obtained in the following manner:—By the depression of the desired key of the keyboard, one of the plates 7 is raised and thus effects the engagement of the pin 23 in the hole 26 of the frame 25 actuating the matrix block 29; by reason of this, the matrix block is stopped in front of the opening of the mold and at the same time the pulley 39 (Fig. 8) transmitting the movements in question is thrown out of gear; the fork 46 is moved to the left with its pin 48, which thus exerts pressure on a pin fitted in the block 68, moves this pin to the left and depresses the catch 67ᵃ the end 67 of which rises and releases the lever 63 which, in a known manner, effects the throwing into gear of the sleeve 60 with the sleeve 59 driving the cam shaft 53. This throwing into gear takes place immediately the longitudinal movement of the matrix block is interrupted but since the interruption of the rotary movement of the matrix block may, in some cases be rather delayed, it would be possible for the cam shaft 53 to press the mold against the matrix block before the rotary movement is completed. To prevent this, on a shaft 154 carried by the standard 146, is mounted a stop-lever 155 (Figs. 20 and 21), which detains the lever 63 and does not permit the sleeve 60 to come into gear with the sleeve 59 until one of the pins 13 of the support 8 has found one of the ten holes 31ᵃ formed in the drum 31 and has entered into it. The removal of the lever 155 (Figs. 2 and 2ᵃ), which engages behind the bent up end 63ᶜ of the lever 63, Fig. 8, is effected by a second lever 156 which is mounted on the shaft 154 and is actuated by the lever 87*. As has been explained above, the release of the bar 12 bearing the pin 13 which extends into the drum 31 (Fig. 6), imparts a rotary movement to the bar 17ᵃ about its axis 85 and thereby moves the connecting rod 16 in the direction indicated by the arrow. The connecting rod 16 is connected to the lever 87* (Fig. 2) which exerts pressure on the stud 156ᵃ of the lever 156, Fig. 21, actuates the lever 155 and thus releases the lever 63 and consequently permits the sleeve to be thrown into gear. A spring 154ᵃ wound around the shaft 154 acts upon the same in order to hold the stud 156ᵃ in contact with the lever 87*. By reason of this arrangement, the shaft 53 cannot be thrown into gear before the rotary movement of the drum has been interrupted. After the molten metal has been squirted between the two parts of the mold, and after it has set, which takes place instantaneously, the lower part 88 of the mold is drawn back into the mold frame 87 by the lever 97 by means of the connecting rod 98 and of the cam 100, the latter being in the position shown in Fig. 13. The cast type remains in the lower part of the mold where it is held by two pins 156ᵃ which project a few tenths of a millimeter into the interior 112 of the mold and engage in the type; as these two pins are arranged in the lower part of the mold, the cast type is carried along by this part and brought outside the frame of the mold. The pins 156ᵃ are movable in a plate 157 (Fig. 14) and their ends are fixed in a slide 158. The latter is furnished with a projection 159, which is reciprocated by a lever 160, Figs. 12 and 13, in the direction of the pins 156ᵃ. As these two pins are engaged in the type itself it follows that, when the slide 158 moves forward, the type, is carried forward ready to be ejected from the lower part of the mold; Fig. 13 shows the plate 157 and the slide 158 in a position in which the pins are drawn back after the type has been introduced into the composing mechanism. The cast type in this figure are lettered T. The ejection of the type is effected by the lever 160 one end 161 of which engages in the groove of a cam 162 fixed on the shaft 53 and whose other end, at the desired moment, moves the projection 159 and ejects the type from the lower part of the mold as set forth; the type is then taken up by the composing mechanism.

The composing mechanism comprises a frame 163 (Fig. 23) which in the middle bears a quick threaded screw 164 which screws into the lower part of a movable plate 166 (Figs. 18 and 19), and moves it in a longitudinal direction on the frame 163. At its other end 164ᵃ, the screw 164 is provided with a pinion 164ᵇ which gears with a second pinion 164ᶜ acted upon by a coiled spring 164ᵈ. Under the action of this spring the screw 164 is rotated and is thereby caused to press the plate 166 on to the type T, in such a manner as to hold them clamped against the frame 163. As new type T are introduced, the plate 166 is pushed back by the same, in such a manner that, the thread of the screw 164 being very rapid, the latter receives a rotary movement and the spring is stressed. The frame 163 is screwed on to two supports 165 and 165ᵃ (Fig. 19), which are keyed to one shaft 167. This shaft is supported by a double bearing 168 in which it can rotate and simultaneously move in a longitudinal direction. The movement in the longitudinal direction is effected by a double lever 169 which is actuated by a cam 170. The cam 170 is mounted on a shaft 171 which is continuously rotated by a pinion 172. The pinion 172 is actuated by a small pinion 173 which is secured to a pulley 174 driven by the pulley 40. To the cam 170 there is also connected another cam 175 which actuates a lever 176 connected by a rod 177 to a crank 178 mounted on the shaft 167 (Fig. 18). When the cast type brought into the frame 163 have approximately filled the length of a line, the plate 166 meets the abutment 179 arranged beneath the frame 163 (shown in Fig. 19), and by reason of this contact, an audible signaling device 180 is actuated by a rod 181 connecting it to the abutment 179 and which can be adjusted for different lengths of line. In order to prevent the line of composed type from bulging upward, it is covered by a plate 182 which is moved parallel thereto by means of two levers 183 and 183ª, in such a manner as to be capable of being brought back to the rear at the desired moment, in order to release the line of composed type so that the type can be moved in an upward direction. At its front end where the frame 163 is fitted to the lower part 88 of the mold, this frame is provided with a detent 184 which prevents the composed type from passing out, therefrom. The lever 169 in its normal position shown in Fig. 19, keeps the shaft 167 near the lower part 88, so that the frame carried by this shaft by means of supports 165 and 165ª is pressed against said lower part 88; but as soon as the composing of one line is completed, the operator pulls a button 185 which raises a detent lever 186 which, in any suitable manner, throws the cam 170 into gear with the constantly rotating shaft 171. The cam then makes one revolution and automatically throws itself out of gear again. The first result of this rotary movement is, by means of the cam 170 and the lever 169, to move the frame 163 with the composed line of type, away from the lower part 88 of the mold; after this movement, the lever 176 thrust forward by means of the cam 175 comes into operation and, by means of the connecting rod 177, turns the crank 178 which imparts to the shaft 167, and consequently also to the frame 163, a rotary motion through an angle of 90°. Fig. 24 shows the lowermost position of the frame, in which the type T are received therein, the plate 182 being then above the line of type. In Fig. 23, the shaft 167 is shown in the position after it has been rotated through an angle of 90°, namely, at the moment when the composed line of type T is transferred to a galley Z. Above the composing mechanism, hereinafter described, there is a collecting table 187 (Fig. 18) on which the galleys Z slide (Figs. 23 and 24). This table comprises a supporting plate and three longitudinal bars 187ª, 187ᵇ, 187ᶜ (Fig. 2), which are connected by two transverse bars 188. The transverse bars 188 are provided with slots 188ª which serve as guides for screws 188ᵇ and permit the longitudinal bar 187ᵇ to move laterally according to the length of the line. The longitudinal bar 187ᵇ supports a galley Z in a suitable position; when it is desired to compose lines of another length, a broader or narrower galley is introduced and the position of the bar 187ᵇ is adjusted by means of screws 188ᵇ so as to support this galley laterally.

On the galley Z slides a block 189 provided with a spring for returning it, and operating to prevent the fall of the engaged type T (Figs. 1, 23 and 24). As each new line is added this block 189 is pushed back along the galley Z. In order to permit a composed column of types to be tied up with a string or the like, the block 189 is provided with an angle plate 190 which is fixed thereto by a bolt 191. When the column is to be tied, the angle plate 190 is released by unscrewing the bolt 191 so that it can be removed which leaves the necessary space for the string which can then be tied around the column.

On the longitudinal bars 187ª and 187ᶜ is fixed a plate 192 which is furnished with two bars and an angle plate arranged to grasp the line of type and to move it farther on. Fig. 24 shows the composing mechanism in the position which it occupies when a line is to be composed. The movement which this mechanism makes, after the line is completed, is here indicated by an arrow. In this position the member 193 which effects the introduction of the type into the galley, is arranged vertically and presses on the lines of type contained in the galley Z. When the completed line is moved to the left away from the mold 88, the lever 169 actuates a bent lever 194 one end of which is forked and embraces the said lever 169. The movement of the lever 194 is transmitted by means of a connected rod 195, to a crank 196 (Fig. 18) whereby the member 193 is brought into the position shown in Fig. 23. The member 193 turns on a shaft 193ª and bears at its ends two levers 197 connected to rods 198 which are pivoted at 199 on a plate 200. By a partial rotary motion of the member 193, the lever 197 is depressed and acts, by means of connecting rods 198, on a plate 200 which moves down and comes in front of the line of type, thus preventing it from being thrown out. The line of type T presented by the frame 163 thus comes into contact with the plate 200 and before the frame 163 moves away, a second plate 201 is depressed and then holds the last line in such a manner that it cannot be carried away by the return movement of the frame 163. The plate 201 is actuated by two levers 202 mounted on each side of the collecting table 187 respectively. These two levers are fixed on a shaft 203 on which is also keyed a lever 204 (Fig. 19) which is actuated by the cam 205. After the line which has just been deposited is supported by the plate 201, the frame 163 descends again and is applied against the mold in order to receive a new line of type. This movement is effected by the lever 169 which, at the same time, drives the bent lever 194 which, by means of the connecting rod 195 (Fig. 18), and the lever 196, brings back the member 193 into its original position, as shown in Figs. 18 and 24, and by this means the line of type just added is pushed farther to the rear in order to provide the necessary space for a fresh line in the galley Z.

In setting up ordinary matter, it is necessary to separate the different words by spaces. The thickness of the spaces is not always the same, and depends on the space, at which may be more or less, remaining at the end of the line to be filled out in order to justify the latter. For certain work, spaces of a definite thickness are also used, for example, em-quads, en-quads, etc. The machine described is arranged to cast four different thicknesses of spaces by depressing certain keys on the keyboard. Fig. 2 shows three of these keys, namely, the keys 20, 20$^a$ and 20$^b$ each serving to cast a space of a different thickness. The key 20, which is fitted to the end of a rod 206 allows the thirteenth bar, that is to say the uppermost bar 22 (Fig. 8), to project into the frame 25 and stop the matrix block 29 in a position in front of the opening of the mold in which a dummy matrix (without an intaglio character) appears in front of the mold. In order that the rotary movement may be thus interrupted, the rod 206 (Fig. 3) bears a block 207 which comes into contact with a small lever 208 mounted on the same shaft as the oscillating longitudinal bar 6, in such a manner that a pin 13 of the support 8 is released and interrupts the rotation of the matrix block. The rod 206 also bears a block 209 which when the key 20 is depressed, actuates the lever 19 which releases the bar 22 and interrupts the longitudinal movement of the matrix block. When a dummy matrix is brought to the mold aperture, the plate 124 is also brought opposite to the end 122$^a$ of the lever 122 (Fig. 13), and during the advance of the mold frame, the plate 124 acts on the lever 122$^a$ which then permits the slide 118 to come in front of the mold aperture ready for casting a short space. However, as the key 20 only effects the interruption of the two movements of the matrix block without effecting adjustment of the width of the mold, the upper part of the mold closes almost completely on to the lower part, only leaving a small gap which corresponds to the smallest space the machine is adapted to cast, and the metal squirted in forms a thin plate which serves to compensate for any differences in the spaces between the different words, that is to say for spacing of the words. In order to be able to also cast a thick space, the upper part of the mold should be stopped in a predetermined position, so that it closes only to the desired extent, and as a dummy matrix again appears in front of the mold aperture and no tooth 29$^b$ of the comb 29 is engaged between the projections 113 and 114 it is necessary for this purpose to have recourse to other means. In the arrangement adopted, the lever 101 fixed to the lever 103 (Fig. 14) is operated to move the upper part of the mold and to permit it to close. In Fig. 14, the lever 101 projects on the left hand side of the frame of the mold. On this side is arranged a lever 210 visible in Fig. 1. This lever is keyed on the shaft 211 which is mounted in bearings 212, 213 and 214. On this same shaft is keyed a second lever 215; the shaft itself is acted upon by a spring 216 which tends to impart thereto a rotary movement in one direction, as well as to the levers 210 and 215. A detent pawl 217 (Fig. 3) extending into a notch in the lever 215, is actuated by means of levers 218, and is moved away from the lever 215 which it releases when the keys 20$^a$, 20$^b$ are depressed together with a third key not shown in the drawing. By the depression of one of these keys 20$^a$ or 20$^b$, one of the pawls 219 is raised and stops the lever 215 released by the pawl 217, as it makes a rotary movement in the direction of the arrow with its shaft 211, this movement being communicated to the lever 210. As shown in Fig. 3, these three detent pawls 219 are of different lengths and each of them stops the lever 215 in a different position. It follows that the lever 210 is also stopped each time in a different position.

The lever 210 which is shown in Fig. 11, is provided at its lower part 210$^a$, with three steps on one of which rests the end of the lever 101 which actuates the upper part of the mold; the end of the lever 101 is thus held at a predetermined height. In the normal position, this lever 101 rests on the abutment 220$^a$ of the slide 220. But during the forward movement of the mold carriage, the lever 101 leaves the support of the abutment 220$^a$ and is free to descend. The extent to which it descends depends upon the position of the step of the lever 210, and the more its descending movement is increased, the greater will be the degree of closure of the mold. It is thus evident that accordingly as the lever 215 is stopped by one or other of the pawls 219, it makes a longer or shorter oscillatory movement, and this movement is shared by the lever 210, so that the first, the second or the third step at the end 210$^a$ of the lever 210 is brought beneath the lever 101. When the casting of a space is completed, the lever 210 should obviously be brought back into its initial position wherein it is held by means of the detent pawl 217 which acts on the lever 215 (Fig. 3). The return to this position is effected by means of a projection on the side of the cam 221 (Figs. 2 and 11) which is mounted on the main shaft 53. The said projection causes a bar 222 (Fig. 11), to advance and act on a lever 223 keyed on the shaft 211; the lever 210 is in this manner brought back into its initial position in which neither of the steps on its end 210$^a$ is beneath the lever 101 so that the latter can descend through its complete travel and close the mold to the maximum extent. As the carriage of the mold is again brought back to the rear before the lever 101 is released, the slide 220 is movable in such a manner that, during this rearward movement, the lever 101 engages the projection 220$^a$ and causes it to move slightly out of the standard 212. As soon as the lever 101 is again raised by the lever 107 and by the slide 105 which actuates the lever 96, the projection 220$^a$ comes beneath the end thereof projecting on the mold frame and holds it in this position until the mold frame comes back to the front again.

In order that the cam shaft 53 may be stopped in exact position after each revolution and shall not be carried past this point by reason of its inertia, it is retained in the exact position by a lever 224 acted upon by a spring and provided at its end with a roller which engages in a recess in the cam 221. The lever 224 turns around the same shaft 136 as the lever 135.

From the foregoing it will be clearly seen that all the ten letters arranged on a determined matrix must have the same length, as the width of the mold is adjusted by the comb 29 the teeth 29$^b$ of which have the same thickness as the matrices situated above. As a single tooth 29$^b$ is provided for each of the matrices it follows therefrom that the mold can be adjusted only to a single width for each matrix and the letter must be of the "system arranged in series," that is to say that they must be arranged on the matrices in such a way that the letters stamped or engraved on one matrix be always ten letters having approximately the same width. This "system arranged in series" is adopted in different machines for casting and setting types and the setting produced by these machines is sufficient, especially for the ordinary writings used for the printing of news papers. But as the efforts are always set toward the creation of new forms of writings and as new forms of writings are also frequently created to which a determined "system arranged in series" is not applicable, one is compelled to construct the setting machine so as to be able to produce also writings of this kind. In the setting machine previously described, this result is obtained by a modification of the matrix block described hereafter and by a special releasing device of the closure plate 118, allowing to give a different width to each of the ten letters arranged on a matrix and also to adjust the mold to a different width corresponding to each of these letters.

The whole of the arrangement is illustrated in Figs. 30, 31, 32, 33 and 34. As shown in Fig. 30, the sleeve $t$ carries 12 matrices $m^1$ to $m^{12}$ and a thirteenth matrix $e$ serving exclusively for casting spaces. The matrices are made of copper or bronze and are separated by washers $a$ to $a^{13}$ of tempered steel; these washers protect the matrices against the wear and deterioration which might be produced by the rough application of the mold. As is known, each matrix bears ten different letters in intaglio on the several faces of the decagon and are designated by the letter of reference $l$ in Fig. 31. At the angles formed by two adjacent faces the matrices are provided with recesses $o$ which are designed to receive the projections 113 and 114 of the two parts of the mold (Figs. 32 and 34).

At the moment of casting the type, the frame 87 and the two parts 88 and 89 of the mold which are arranged in this frame, are moved forward by any known means and the two projections 113 and 114 secured to the parts of the mold engage in the recesses $o$ of the two adjacent matrices and inclose the steel washer $a$ separating the two adjacent matrices. In this position, a determined letter of one of the matrices is situated in front of the orifice of the mold, the width of which corresponds exactly to the thickness of the part of the steel washer $a$ comprised between the projections 113 and 114, so that the mold can close only to that extent. As shown in Fig. 30, each of the steel washers $a^1$ to $a^{13}$ are formed, at the places where the matrices $m$ are provided with recess $o$, with suitable projections or hollows, that is to say a different thickness corresponding to a letter stamped in the matrix situated on the left hand side of the steel washer. In Fig. 30, this is indicated by way of example by an "M," an "r" and a "b." These letters are stamped in the matrix and above the letters, at the right hand side, is situated the part of the steel washer $a^{12}$ which presents a greater or lesser thickness according to the width of the letter. It is therefore possible, by means of the steel washers separating the matrices, to give to each letter another thickness, even if letters of a different thickness are arranged on one and the same matrix. This arrangement presents moreover the advantage of rendering superfluous the adjusting comb 29 which increases by its weight the *vis viva* of the block effecting a to and fro motion and can prevent injurious shocks in case of sudden stoppage. The thirteenth matrix $e$ (Fig. 30) does not bear any letter and serves for casting spaces. In order to be also able to cast, according to requirements, thick or thin spaces, the steel washer $a^{13}$ for the space matrix $e$ presents a greater or lesser thickness at the corresponding places.

The steel washers $a^1$ to $a^{13}$ replace the comb 29 and as the latter is situated above the matrix, the projections 113 and 114 had to be arranged above the mold opening. In the second arrangement of the matrix block in which the comb 29 is dispensed with, the projections 113 and 114 are secured under the mold opening (Figs. 32 and 34), this not changing in any way the function. As in the first arrangement described, the comb 29 has also for its purpose to bear, by means of the plate 124 (Figs. 12 and 13) secured thereto, against the locking lever 122ª each time a space is to be cast, in order that the slide 118 may come opposite the mold opening; this arrangement must be replaced by another in the case the comb 29 is dispensed with. In this case, the lever device illustrated in Figs. 32 to 34 is used.

When a space key is depressed, the upper bar 22 of the support 9 (Figs. 32 and 33) is released and, by means of its pin 23 and other known means, it stops the blocks with the space matrix opposite the mold opening. Then there is produced a displacement of the bar 22 with its pin 23 and the latter enters, in the direction of the arrow (Fig. 33), in a hole of the frame connected to the matrix block, and transmits this movement to the double lever 250 which, in its turn, transmits the movement to the lever 251, to the connecting rod 252 and to the slide 253. The slide 253 is movable on the axis 211 and a bar 211ª prevents it from rotating about the axis 211. At its front part, the slide 253 is terminated by a finger 253ª which, when a space key is depressed, is brought opposite the locking lever 122ª, by reason of the displacement of the bar 22, the levers 250 and 251 and the connecting rod 252; therefore if the mold frame 87 moves forward, the lever 122ª is pressed against the finger 253ª. By this fact, the closure plate 118 is released; it closes in front the mold opening and a shortened space is thus obtained. During the time the mold frame 87 moves back, the end 122ª of the locking lever also moves away from the finger 253ª and can consequently lock in its position of rest the closure plate 118 which was just again withdrawn. As, after each casting of a space, the bar 22 is also withdrawn and with it the levers 250 and 251, the slide 253 is also moved by means of the connecting rod 252 in a position in which its finger 253ª cannot come in contact with the lever 122ª (Fig. 34) and allows the casting of the types at their normal height. This arrangement renders superfluous the plate 124 of the comb 29, so that the latter may also be entirely dispensed with, since its function is fulfilled by the previously described arrangement of the steel washers on the matrix block.

The operation is as follows:—One of the five matrix blocks which are in the frame 27, namely the block arranged exactly opposite the mold, is maintained by the lever 33 in constant reciprocatory movement, and at the same time receives by means of the pinion 32 a rotary motion which is transmitted to the said pinion, by means of gearing and a pulley 73, on a shaft 56 which is continuously rotated. These two movements are interrupted, as required, by depressing a key on the keyboard 2 which causes the matrix block to stop, when a predetermined character or matrix arrives in front of the mold aperture, by means of mechanism arranged in the supports 8 and 9. The interruption of the reciprocatory movement causes the cam shaft 53 to be immediately thrown into gear with the continuously rotated gears 54 and 55; but in case the rotation of the matrix block is not completed at the instant the reciprocatory movement ceases, the throwing in of the gears is prevented by the lever 155, until the rotary movement is also interrupted, that is to say until a pin belonging to the apparatus 8 passes into a hole 31ª in the drum 31. When the shaft 53 is thrown into gear by means of the sleeves 59 and 60, the cam 148 first moves forward the plunger 147 which holds fast the frame 25 in the exact required position and also the matrix block in front of the mold. The cam 100 immediately after, by means of the spring connecting rod 98, advances the mold carriage 87 until the mold effectively rests against the matrix block. The cam 145 advances the carriage by means of the lever 142 and the connecting rod 141, brings the mouth piece 95 up to the plate 94 of the mold, and hermetically closes the joint between the matrix block, the mold and the plate. The pump lever 135 is then set free by its cam 139 and squirts the metal into the mold. Before the introduction of the metal into the mold, the end 107ª of the lever falls into a notch in the cam 108; the other end of this lever then raises the slide 105 which is guided in the mold carriage and, consequently, the mold is closed in the known manner by the levers 96 and 101 to the extent determined by the adjusting comb 29. After the squirting in of the metal, the pump carriage 140 first moves away from the mold, the short end 107ª of the lever 107 is then raised by its cam 108, depresses the slide 105 and, consequently, also the lever 96 which exerts pressure on the pin 94ᵈ of the plate 94 and the latter then trims the type at its rear end. After the trimming of the type, the lower part of the mold is drawn by the connecting rod 98 to the rear of the carriage 87 in such a manner that the cast type is brought in front of the composing mechanism. The ejection of the type is then effected by the lever 160 actuated by the cam 162, the lever 160 then immediately returns to its initial position and brings back the slide 158 with the ejecting pins 156ª. As the return to the front of the lower part of the mold results in bringing back to the rear the mold carriage 87 by means of the plate 126ª, Fig. 16, the projections 113 and 114 are moved away from the comb 29 which is thus set free as well as the matrix block 28, which can then continue its reciprocatory movement. This operation can only be effected by the throwing into gear of the parts which have been thrown out of gear by the depression of a key of the keyboard; the reciprocatory movement is again thrown into gear by the tappet 62ª on the pinion 62 (Figs. 2 and 9) mounted on the main shaft 53, which at this moment pushes back the roller 225 of the lever 226. This movement is transmitted by means of the connecting rod 228 to the lever 229 which turns to the left about its shaft 43 and drives the bar 42 which acts on the pawl 41 of the bar 22; by this means the pin 23 is withdrawn from the hole 26 in the carriage 25 and the latter is thus released. By reason of this movement, the plate 44 (Figs. 8 and 9) moves to the right and enables the forked lever 46 which actuates the clutch 47 to move to the right and thus effect the throwing into gear of the pulley 39. Since the pulley 39 is continuously rotated, rotation is transmitted immediately to the sleeve 47 and to the toothed wheel 49 mounted on the shaft 50: the crank 38 is thus rotated and by means of the connecting rod 51 transmits a vertically reciprocatory motion to the frame 25. The matrix block 29 then resumes its reciprocatory movements. The parts effecting the rotary movement are thrown into gear by the cam 83 which simultaneously moves the lever 87* (Fig. 2) and, consequently, the lever 16 which actuates the lever 17; it therefore follows that the bar 12 is moved to the rear by the bar 17ª and at the same time the pin 13, which is integral with the bar 12, is withdrawn from the hole 31ª of the drum. The drum is thus released and the sleeve 74 is thrown into gear during the return of the bar 12 by the end 17ᵇ (Fig. 6) of the lever 17 pressing against the pin 76 on the lever 77 (Fig. 5) which, by means of the connecting rod 77ª, imparts to the bent lever 80 and to the sleeve 74, a movement toward the pulley 72 which is thus thrown into gear. The slide 79 is at the same time released and is pushed by its spring 79ᵇ behind the lever 80ª in such a manner as to prevent the return of the said bent lever and to hold it until the clutch is thrown out of gear in the known manner by a fresh depression of the key. In order to permit the matrix block to resume its reciprocatory movement, the plunger 147 is withdrawn by the cam 148 acting through the lever 150, and the frame 25 is thus completely released.

The cast type is retained in the type carrier by the detent pawl 184 (Fig. 19), until the line has approximately reached the desired length. This is indicated by the signal device 180, and the vacant space which remains is filled by spaces if the line does not extend to the exact length required. By pulling the button 185, the cam 170 is coupled with the shaft 171, whereby the line set up is lowered in the manner above described and is received by the collecting table. The lines set up thus form a column and they are taken away as required with the galley in which they lie. The galley removed is then replaced by another in order to permit work to be continued on the keyboard.

The matrix carrying frame 27 (Fig. 3) bears five matrix blocks which permit types from different fonts to be employed in the matter set up. Bevel gearing 27ª provided with a crank 27ᵇ permits the frame 27 to be raised and lowered and the desired matrix block to be brought in front of the mold. The arrangement of the gearing is generally known, and does not require special description. In order that the matrix carrying frame may be stopped in an absolutely exact position opposite to the mold aperture, this frame is provided laterally with a conical pin 27ᶜ (Fig. 2) furnished with a handle 27ᵈ, this pin engages in corresponding holes of the matrix frame and supports the said frame exactly in one or another of five different positions in order that each of the five matrix blocks may come into the exact position in front of the mold. It is obvious that if it be desired to move the frame, the conical pin which engages in the following hole should be removed by means of the handle above mentioned.

As the lines composed are not justified exactly and as they may require to be corrected, this work is done in a single operation, and in order to be able to do it easily and without difficulty there is employed for this purpose a table which is shown in Figs. 27 and 28. This table comprises a plate 230 which is screwed on to a frame 231. On each side and in the middle are fixed longitudinal bars 232, 232ª, 232ᵇ which are connected together by three bars 233 provided with slots in which slide screws 234, designed to keep two movable longitudinal bars 235 in predetermined positions in accordance with the length of the line. The columns formed by the composed lines T are taken to the casting machine and are placed with their galley Z' on the table. By grasping the bars 235 which are locked by the screws 234 in this position, the galley is retained on the table. The first line composed comes against the movable plate 236 which prevents it from escaping. The movable plate 236 is fixed on a movable bar 237 which can slide on a plate 238 extending the entire width of the table. In the plate 236 is fixed an operating button 239 by the aid of which the plate 236 can be moved to the right and left. On the inside of the plate 236 is fixed a second plate 240 and a third plate 241, at a distance apart which correspond to the exact length of the line. The column is held by a block 189 by means of which the whole column in the galley Z' can be moved forward in the direction of the arrow, in such a manner that the first line engages between the two plates 240 and 241. In this position the line composed is easily accessible and can be justified exactly, and it is also possible in this position to make the necessary corrections. When this work is done, the button 239 is pushed in the direction of the arrow and causes the corrected line to move through a predetermined distance to the right until it comes opposite a second galley $Z^2$ which is held in the same manner as the galley Z' by a movable bar 235 and a screw 234. The line which is then in front of the galley $Z^2$ is introduced into the latter by means of a lever 242 which is fixed on a shaft 243 mounted in bearings 244. On this shaft are keyed two arms 245 which are connected by a bar 246. If the lever 242 is actuated, the shaft 243 receives a rotary motion as well as the two arms 245 which bear the bar 246, so that the latter will move in a circular path and push forward the line which is in front of it, into the galley $Z^2$. When the line is in position in the galley $Z^2$, the button 239 is again pulled to the left to bring in front of the galley Z' the space between the plates 240 and 241 and, by advancing the block 189, a second line is brought into this space; this line is then corrected and justified as before. In this position the plate 241 is brought in front of the line previously engaged in the galley and it prevents the type from escaping. When the second line is thus corrected, it is brought in the same manner into the galley $Z^2$ into which it is pushed, and so on. By means of this table it is possible to justify and correct in a very convenient manner a piece of composition produced by the casting machine in order to prepare it for printing.

Claims.

1. A machine for casting and setting types comprising a casting mold, a block having matrices on its periphery, means for constantly moving said block, means directly actuatable by hand for stopping said block when the desired matrix comes opposite the mold, a cam shaft for controlling the casting of the types and their removal from the mold, means for clutching said shaft only when the block is stopped, means for stopping the cam shaft after it has made a complete revolution and means for restarting the matrix block after the type has been cast and removed from the mold.

2. A machine for casting and setting types, comprising in combination a casting mold, a block having matrices on its periphery, means for constantly moving said block, bolts for locking said block when the desired matrix comes opposite the mold, means directly actuatable by hand for engaging with said bolts, a cam shaft for controlling the casting of the types and their removal from the mold, a clutch sleeve for clutching said shaft, a spring for pushing this sleeve in the clutching position, an engaging device (67, 155) for holding said sleeve in the unclutching position, means (44, 48, 68 and 17, 16, 87*, 156) for connecting the bolts of the block with the engaging device for the purpose of allowing said device to release the sleeve toward its clutching position at the time the bolts of the block move for locking the matrix block, a lever 63 for bringing back the sleeve to its unclutching position, a cam $69^a$ rigidly mounted on the cam shaft for moving said lever when the cam shaft has effected a complete revolution, and a cam rigidly mounted on the cam shaft for withdrawing the bolts of the matrix block and allowing it to restart.

3. A machine for casting and setting types, comprising a casting mold for casting the types, a block having matrices arranged on its periphery according to circular rows, means for imparting to the block, a rotary movement about its axis, means for imparting to the block a reciprocating motion according to its axis and transversely to the mold, locking members for stopping the movement of said block when the required circular row of matrices comes opposite the mold, locking means for stopping the rotary motion of the block when the required matrix comes opposite the mold, a keyboard comprising a series of keys directly actuatable by hand, means in relation with each key for putting in active position those of the locking members that are adapted to stop, the matrix block in the required position, a cam shaft for controlling the casting of the type and its removal from the mold, means for automatically clutching said cam shaft when the block stops, means for unclutching said shaft when it has effected a complete revolution, a cam rigidly mounted on the cam shaft for withdrawing the locking members of the block and allowing the latter to restart when a type has been cast.

4. A machine for casting and setting types, comprising a casting mold in two movable parts for casting the types, means for adjusting the spacing apart of the two movable parts according to the thickness of the type to be cast, a prismatic block having matrices arranged on its periphery according to circular rows, means for imparting to the block a rotary motion about its axis, means for imparting to said block a reciprocating motion along its axis and transversely to the casting mold, locking members for stopping the movement of said block when the required circular row of matrices comes opposite the mold, locking members for stopping the rotary motion of the block when the required matrix comes opposite the mold, a keyboard comprising a series of keys directly actuatable by hand, means in relation with each key for putting in the active position those of the locking members that are adapted to stop the matrix block in the required position, a cam shaft for controlling the casting of the type and its removal from the mold, means for automatically clutching said cam shaft when the block stops, means for unclutching said shaft when it has effected a complete revolution, two cams rigidly mounted on the cam shaft for withdrawing the locking members of the block and allowing the latter to restart when a type has been cast.

5. A machine for casting and setting types, comprising a casting mold in two movable parts for casting the types, a prismatic block having matrices arranged on its periphery in circular rows, means for imparting to said block a rotary motion about its axis, means for imparting to the block a reciprocating motion along its axis and transversely to the casting mold, locking members for stopping the movement of said block when the required circular row of matrices comes opposite the mold, locking members for stopping the rotary motion of the block when the required matrix comes opposite the mold, a keyboard comprising a series of keys directly actuatable by hand, means in relation with each key for putting in the active position those of the locking members that are adapted to stop the matrix block in the required position, a cam shaft for controlling the casting of the type and its removal from the mold, means for automatically clutching said shaft when the block stops, means for unclutching the shaft when it has effected a complete revolution, two cams rigidly mounted on the cam shaft for withdrawing the locking members of the block and allowing the latter to restart when a type has been cast, a series of teeth forming a comb adapted to follow the reciprocating motion of the block, each tooth corresponding to a circular row of matrices and having a thickness corresponding to the uniform width of the types of this row for adjusting the mold opening, two projections respectively carried by the two movable parts of the mold for coöperating with the teeth of the combs, means for drawing apart the movable parts of the mold, means for pushing the mold against the matrix block when it is at rest and for engaging a tooth of the comb between the mold projections, and means for bringing together the two parts of the mold by pressing the projections against the tooth of the comb.

6. A machine for casting and setting types, comprising a casting mold for casting the types, a rotary shaft $28^c$, a matrix block mounted by means of a sliding key on the shaft $28^c$, a pinion 32 rigidly mounted on said shaft for controlling it, a gearing 70, 71 for actuating said pinion, a prong sleeve 74 for clutching said gearing with a driving pulley, a rocking lever 80 for moving said sleeve, a spring 81 connected to said lever for disengaging the sleeve 74, a bolt $79^a$ for holding the sleeve in the clutching position, a drum 31 keyed on the shaft $28^c$ and having holes in its periphery, bolts 13 adapted to enter into said holes for locking the drum, springs for pressing the bolts 13 against the drum 31, pawls 11 for holding the bolts 13 away from the drum 31, keys forming a keyboard actuatable by hand, means for transmitting the movement of each key to one of the pawls 11 for releasing the corresponding bolt 13, the rocking pawls 18 mounted on the bolts 13, a rocking lever 17 adapted to come in engagement with the pawls 18 for being driven by them when the bolts 13 are released and for bringing back said bolts in their engaging position when the type has been cast, members for connecting the lever 17 to the bolt $79^a$ so that this bolt may be withdrawn when a bolt 13 by moving for entering into a hole in the drum 31, drives along, by its pawl 18, the lever 17, members for connecting the lever 17 to the lever 80, so that the sleeve 74 be clutched when the lever 17 is brought back to its initial position, a cam shaft 53 for controlling the casting of the types and their removal from the mold, a prong sleeve 60 for clutching said shaft, a spring for pushing said sleeve to the clutching position, a bolt 155 for holding the sleeve in the unclutching position, a lever $87^*$ for controlling said bolt, a rod 16 for connecting the lever $87^*$ to the lever 17 so that the bolt 155 be withdrawn through the medium of the members $87^*$, 16 and 17 when one of the bolts 13 reënters a hole of the drum 31, a cam 83 rigidly mounted on the cam shaft 53 for actuating the lever $87^*$ so as to reëngage the bolt 13 through the medium of the members 16 and 17 and to reclutch the sleeve 74 through the medium of the members 16, 17 and 80, and means for bringing back the sleeve 60 in the unclutching position when the shaft 53 has effected a complete revolution.

7. A machine for casting and setting types, comprising a casting mold, a rotary shaft $28^c$, a matrix block mounted by means of a sliding key on said shaft, a rocking lever 33 for imparting to the block a reciprocating motion along the shaft 28°, a slider 25 connected to the lever 33 for imparting to it a rocking motion, a crank mechanism for imparting to the slider 25 a reciprocating motion, a driving pulley 39, a prong sleeve 47 for clutching the crank mechanism with said pulley, a spring for holding the sleeve 47 in the clutching position, a lever 44 for pushing it in the unclutching position, bolts 23 adapted to enter into holes in the slider 25 for stopping it, springs 24 for pushing these bolts against the slider 25, engaging levers 21 for holding the bolts 23 away from the slider 25, spring hooks 41 mounted on the bolts 23, a rocking lever 42 in engagement with said hooks and with the lever 44, so that a bolt 23, by entering the hole of the slider 25 holds the crank mechanism unclutched through the medium of the members 41, 42, 44, 47, keys forming a keyboard, members for connecting each key to one of the engaging levers 21, a cam shaft for controlling the casting of the types and their removal from the mold, a prong sleeve 60 for clutching said shaft, a spring for pushing said sleeve to the clutching position, a lever 63 for holding back the sleeve to the unclutching position, a member integral with the sleeve 47 for releasing the bolt 63 as the sleeve 47 is brought in the unclutching position, a cam 62ª rigidly mounted on the cam shaft 53 for moving the lever 42 so as to bring back the bolts 23 in the engaging position through the medium of the pawls 41, and means for bringing back the sleeve 60 in the unclutching position when the shaft 53 has effected a complete revolution.

8. A machine for casting and setting types, comprising a casting mold for casting the types, a rotary shaft 28°, a pinion 32 rigidly mounted on said shaft for driving the same, a driving gearing 70, 71 for actuating said pinion, a clutch 74 for clutching said gearing with a driving pulley, a matrix block mounted by means of a sliding key on the shaft 28°, matrices arranged on the periphery of said block according to circular rows, a grooved collar at the end of said block, a rocking bent lever 33 provided with a pin entering the groove of said collar for actuating the same and imparting to the block a reciprocating motion, a slider 25 having a pin and slot connection with the lever 33 for rocking it and provided with a hole, a crank mechanism for imparting a reciprocating motion to the slider 25, a clutch 47 for clutching said crank mechanism with a driving pulley, a series of bolts 23 adapted to enter the hole of the slider 25, springs for pushing said bolts against the slider, engaging levers 21 for holding the bolts 23 away from the slider 25, means for unclutching the clutch 47 at the moment the bolts 23 enter the hole in the slider 25, a drum 31 rigidly mounted on the shaft 28° having holes spirally arranged on its periphery, bolts 13 each of which is adapted to enter into one of the holes of the drum 31 for locking it in a determined position, springs for pressing the bolts 13 against the drum 31, pawls 11 for holding the bolts 13 away from the drum, means for unclutching the clutch 74 at the moment a bolt 13 enters into a hole of the drum, a series of keys constituting a keyboard adapted to be actuated directly by hand, means for transmitting the movement of each key of the keyboard to an engaging lever 21 and to a pawl 11 for releasing both a bolt 23 and a bolt 13, a cam shaft 53 for controlling the casting of the type and its removal from the mold, a prong sleeve 60 for clutching said shaft, a spring for pushing said sleeve 60 in the clutching position, a rocking lever 63 for acting upon the sleeve 60 in the opposite direction to the spring, a bolt 67 for holding said lever in the unclutching position of the sleeve, means for withdrawing said bolt when a bolt 23 has entered the hole of the slider 25, a stop lever 155 for holding the lever 63 in the unclutching position of the sleeve 60, means for withdrawing said stop lever when one of the bolts 13 has entered in one of the holes of the drum 31, a cam 69ª rigidly mounted on the cam shaft 53 for pushing back the lever 63 to the unclutching position of the sleeve 60 when the shaft 53 has effected a complete revolution, a cam 62ª and a cam 83 rigidly mounted on the cam shaft 53 for respectively bringing back in their engaging position the bolts 13 and 23 which have been released and for clutching the clutches 74 and 47.

9. A machine for casting and setting types, comprising a casting mold, a block having matrices on its periphery, means for imparting to the block a rotary motion, means comprising a slider for imparting to the block a to-and-fro motion, locking members for stopping the to-and-fro motion of said slider when the required row of matrices is opposite the mold, means for stopping the rotary motion of the block when the required matrix comes opposite the mold, a keyboard actuatable by hand for controlling the corresponding locking members, a cam shaft for controlling the casting of the types and their removal from the mold, means for clutching said shaft only at the moment the block is stopped, means for stopping the cam shaft when it has effected a complete revolution, a centering punch co-operating with holes of the slider controlling the to-and-fro motion of the block for rectifying the stoppage position of said slider, a cam rigidly mounted on the cam shaft for pushing the punch in the engaging position, in order to insure the exact position of the matrix block during the casting, a spring for disengaging said punch when the casting has been effected, and means for withdrawing the locking members and restarting the matrix block when the type has been cast.

10. A machine for casting and setting types, comprising a framing, a mold frame mounted so as to slide longitudinally on said framing, one mold half of angular shape mounted on the frame so as to slide longitudinally, a second mold half of angular shape forming with the first half a molding cavity and arranged so as to slide transversely in the said frame for varying the width of the molding cavity, a spring for moving the second half toward the first half, pins adapted to slide transversely in the first mold half for forcing out the type that has been cast, a block having matrices on its periphery, means for constantly moving said block, means directly actuatable by hand for stopping said block when the desired matrix comes opposite the mold, a cam shaft, means for clutching said shaft at the moment the matrix block stops, means actuated by the cam shaft for pushing the mold frame against the matrix block and for injecting some melted metal in the mold, means controlled by the cam shaft for moving the second half of the mold away from the first half and releasing it after the mold frame has been brought near the matrix block, means for preventing the second half of the mold being brought by its spring near the first half beyond the appropriate width, means controlled by the cam shaft for moving backward the first half of the mold, means actuated by the cam shaft for pushing the pin within the mold in order to laterally force out the solidified type, means for stopping the cam shaft when it has effected a complete revolution, and means for restarting the matrix block.

11. A machine for casting and setting types, comprising one mold half in the shape of a right angle, a second mold half in the shape of a right angle, movable transversely to the first half and shorter than the latter, a small plate, mounted on the face of the second half so as to slide transversely and shaped so as to extend the length of the second half to the length of the first one, a bolt 122$^b$ for holding the plate fixed with the second half in ranging position, a spring 121$^a$ for pushing the plate against the first mold half for closing the mold in front for the casting of spaces, a block having matrices on its periphery, means for constantly moving said block, means directly actuatable by hand for stopping said block when desired matrix comes opposite the mold, a cam shaft for controlling the casting of the types and their removal from the mold, means controlled by the cam shaft for laterally moving the plate and the second half of the mold away from the first half, a spring for moving said half toward the first half, means for limiting the bringing together of the mold halves, means for withdrawing the bolt of the plate while the casting of a space is effected, means for unclutching the cam shaft when it has effected a complete revolution, and means for restarting the matrix block.

12. A machine for casting and setting types, comprising a mold having one half movable longitudinally and one half movable transversely, a matrix block adapted to move in front of the mold, means for constantly moving said block, means actuatable by hand for stopping this block when the required matrix comes opposite the mold opening, a cam shaft for controlling the casting of the type, means for clutching the cam shaft at the moment the matrix block stops, means controlled by the cam shaft for moving backward the first half when the casting of the type has been effected, pins transversely sliding in said half for forcing out therefrom the solidified type, means actuated by the cam shaft for pushing said pins, a horizontal composing stick rule adapted to receive the types forced out by the pins, a spring slider (166, 164, 164$^d$) for pushing toward the mold the types placed in a line on said rule, a pawl 184 for holding the types on the rule when the mold half is removed from the rule, a galley placed above the composing mechanism for receiving the lines formed on said rule, means for causing this rule to oscillate about an axis parallel to itself so that the line of types be brought on the galley, means for pressing this line against the lines previously brought on the galley, means for holding the line which has just been brought on the galley when said rule comes back to its initial position, means for unclutching the cam shaft when it has effected a complete revolution, and means for restarting the matrix block.

The foregoing specification of my improvements in machines for casting and composing separate type signed by me this twenty-sixth day of June, 1912.

FRANZ SCHIMMEL.

Witnesses:
H. C. COXE,
GEORGES CHARLES COQUET.